(12) United States Patent
Zheng et al.

(10) Patent No.: US 12,256,348 B2
(45) Date of Patent: Mar. 18, 2025

(54) SYNCHRONIZATION SIGNAL TRANSMISSION METHOD AND COMMUNICATIONS APPARATUS

(71) Applicant: HUAWEI TECHNOLOGIES CO., LTD., Guangdong (CN)

(72) Inventors: Juan Zheng, Beijing (CN); Chaojun Li, Beijing (CN); Tong Ji, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 447 days.

(21) Appl. No.: 17/585,159

(22) Filed: Jan. 26, 2022

(65) Prior Publication Data

US 2022/0150853 A1    May 12, 2022

Related U.S. Application Data

(63) Continuation of application No. PCT/CN2020/110089, filed on Aug. 19, 2020.

(30) Foreign Application Priority Data

Aug. 21, 2019 (CN) .......................... 201910774515.X

(51) Int. Cl.
*H04W 56/00* (2009.01)
(52) U.S. Cl.
CPC ................................ *H04W 56/001* (2013.01)
(58) Field of Classification Search
CPC ... H04W 56/001; H04J 3/0608; H04J 3/0638; Y02D 30/70; H04L 5/0051; H04L 27/2613
See application file for complete search history.

(56) References Cited

U.S. PATENT DOCUMENTS

| 7,653,166 | B2 * | 1/2010 | Wagner | H04L 27/0014 375/354 |
| 8,649,401 | B2 * | 2/2014 | Luo | H04L 27/2626 370/514 |

(Continued)

FOREIGN PATENT DOCUMENTS

| CN | 107431679 A | 12/2017 |
| CN | 107592668 A | 1/2018 |

(Continued)

OTHER PUBLICATIONS

Office Action issued in Chinese Application No. 201910774515.X on Jun. 22, 2022, 6 pages (with English translation).

(Continued)

*Primary Examiner* — Abdullahi E Salad
(74) *Attorney, Agent, or Firm* — Fish & Richardson P.C.

(57) ABSTRACT

This application provides a synchronization signal transmission method and a communications apparatus. The synchronization signal transmission method and the communications apparatus are applied to the communications field. In the synchronization signal transmission method, a synchronization signal generated and sent by a network device may include a first sequence and a second sequence. The first sequence is a first complex sequence or a sequence obtained based on the first complex sequence. The second sequence is a sequence obtained based on the first complex sequence, and the second sequence is different from the first sequence. Because a correlation processing result between the first sequence and the second sequence is still a complex sequence, there is a good correlation property, so that a terminal device can obtain a relatively sharp correlation peak when synchronizing with the network device based on the synchronization signal, thereby effectively shortening duration required for synchronization.

17 Claims, 22 Drawing Sheets

(56) References Cited

U.S. PATENT DOCUMENTS

| | | | |
|---|---|---|---|
| 9,615,341 B2* | 4/2017 | Sartori | H04J 11/0073 |
| 10,548,105 B2* | 1/2020 | Wang | H04W 72/0453 |
| 10,652,884 B2* | 5/2020 | Zheng | H04B 7/2656 |
| 11,026,193 B2* | 6/2021 | Kim | H04W 72/046 |
| 2008/0062959 A1 | 3/2008 | Rudolf et al. | |
| 2010/0039998 A1* | 2/2010 | Imamura | H04J 13/22 370/329 |
| 2015/0117295 A1 | 4/2015 | Yeh et al. | |
| 2018/0220387 A1* | 8/2018 | Ji | H04W 72/0453 |
| 2018/0248680 A1 | 8/2018 | Ji et al. | |
| 2018/0270095 A1* | 9/2018 | Ahmad | H04J 13/0062 |
| 2019/0223155 A1* | 7/2019 | Lu | H04W 56/001 |

FOREIGN PATENT DOCUMENTS

| | | |
|---|---|---|
| CN | 108289070 A | 7/2018 |
| WO | 2017049716 A1 | 3/2017 |
| WO | 2017070944 A1 | 5/2017 |
| WO | 2018087706 A1 | 5/2018 |

OTHER PUBLICATIONS

Office Action issued in Chinese Application No. 201910774515.X on Jul. 5, 2021, 16 pages (with English translation).

PCT International Search Report and Written Opinion issued in International Application No. PCT/CN2020/110089 on Nov. 20, 2020, 10 pages (partial English translation).

Qualcomm Incorporated, "NB-PSS and NB-SSS Design," 3GPP TSG RAN WG1 Meeting #84, R1-161116, St. Julian's, Malta, Feb. 15-19, 2016, 18 pages.

Extended European Search Report issued in European Application No. 20853840.5 on Jul. 29, 2022, 8 pages.

* cited by examiner ns apparatus

SYNCHRONIZATION SIGNAL TRANSMISSION METHOD AND COMMUNICATIONS APPARATUS

CROSS-REFERENCE TO RELATED APPLICATIONS

This application is a continuation of International Application No. PCT/CN2020/110089, filed on Aug. 19, 2020, which claims priority to Chinese Patent Application No. 201910774515.X, filed on Aug. 21, 2019. The disclosures of the aforementioned applications are hereby incorporated by reference in their entireties.

TECHNICAL FIELD

This application relates to the field of communications technologies, and in particular, to a synchronization signal transmission method and a communications apparatus.

BACKGROUND

In a communications system, before establishing a data transmission channel with a network device, a terminal device needs to implement synchronization. To be specific, the terminal device needs to synchronize with the network device based on a synchronization signal sent by the network device. In a synchronization process, synchronization time between the terminal device and the network device needs to be minimized to avoid the following case: The terminal device needs to continuously receive a synchronization signal sent by the network device, and therefore power consumption of the terminal device is increased.

However, in a processing process of synchronizing with the network device by using a synchronization signal currently used in the communications system, a correlation processing result between sequences in the synchronization signal is a sequence including +1 and −1. Because the sequence including +1 and −1 has a poor autocorrelation property, a correlation peak is not sharp enough when a correlation operation is performed on the correlation processing result and a local sequence. In other words, a correlation peak obtained by the terminal device has a burr phenomenon. Consequently, duration required for synchronization between the terminal device and the network device is relatively long.

SUMMARY

This application provides a synchronization signal transmission method and a communications apparatus, to implement quick synchronization.

According to a first aspect, this application provides a synchronization signal transmission method. In the synchronization signal transmission method, a synchronization signal includes a first sequence and a second sequence. A first time unit carrying the first sequence is different from a second time unit carrying the second sequence; and the first sequence is a first complex sequence or a sequence obtained based on the first complex sequence, and the second sequence is a sequence obtained based on a second complex sequence, and is different from the first sequence. In the synchronization signal, a correlation processing result between the first sequence and the second sequence is a complex sequence. Therefore, a network device sends the synchronization signal to a terminal device, so that the terminal device can obtain a sharper correlation peak when synchronizing with the network device based on the synchronization signal. In this way, duration required for synchronization is shortened, and quick synchronization is implemented.

The first time unit carrying the first sequence may be understood as a time unit corresponding to sending the first sequence by the network device, in other words, the network device sends the first sequence on the first time unit. Correspondingly, the second time unit carrying the second sequence may also mean that the network device sends the second sequence on the second time unit.

In an implementation, a correlation operation used to calculate the correlation processing result between the first sequence and the second sequence is an operation on corresponding elements of two sequences. The correlation processing result between the first sequence and the second sequence is a sequence obtained by performing point multiplication, point division, conjugate point multiplication, or conjugate point division on corresponding elements of the first sequence and the second sequence.

In an implementation, the first sequence is a sequence obtained based on the first sequence and a first calculation rule; the second sequence is a sequence obtained based on the first complex sequence and the first calculation rule; and the first calculation rule includes any one of a point multiplication rule, a conjugate point multiplication rule, and a conjugate point division rule. The first calculation rule is also an operation on corresponding elements of two sequences.

In an implementation, the first complex sequence is a ZC sequence; or the first complex sequence is a sequence obtained by performing inverse fast Fourier transformation (IFFT) or fast Fourier transformation (FFT) on the ZC sequence, an m sequence, or a gold sequence.

In another implementation, the first sequence is the first complex sequence or a sequence obtained based on the first complex sequence and the first calculation rule. The second sequence is obtained by applying the first calculation rule to the first sequence and the first complex sequence. Optionally, the second time unit is a time unit adjacent to the first time unit. In this way, in this implementation, sequences carried on all adjacent time units may be sequentially determined starting from the first time unit. For example, the first time unit is a start time unit, a last time unit, or a time unit in resources occupied by the synchronization signal in time domain. In this way, sequences carried on other time units may be sequentially determined starting from the first time unit based on this implementation. It can be learned that the network device sends the synchronization signal in this implementation, so that the terminal device can select, for a correlation operation, sequences carried on any adjacent time units, and an obtained correlation processing result is a complex sequence. Further, the terminal may perform a correlation operation on the correlation processing result and a local sequence to obtain a sharp correlation peak, so that duration required for synchronization is shortened.

Adjacent time units may be understood as two adjacent time units in time domain. Two adjacent time units may be consecutive or non-consecutive in time domain.

In an implementation, N time units are classified into at least two time unit groups. The at least two time unit groups may be obtained through classification in a manner predefined in a protocol or in a radio resource control (RRC) configuration manner. The at least two time unit groups include a first time unit group and a second time unit group. The first time unit is any time unit in the first time unit group, and the second time unit is any time unit in the second time unit group. It can be learned that the network device sends the synchronization signal in this implementation, so that the terminal device can select one time unit from each of the two time unit groups, and perform a correlation operation on sequences carried on selected time units, and an obtained correlation processing result is a complex sequence. Further, the terminal may perform a correlation operation on the correlation processing result and a local sequence to obtain a sharp correlation peak, so that duration required for synchronization is shortened.

In an implementation, the first time unit group includes time units whose numbers are odd numbers in the N time units. The second time unit group includes time units whose numbers are even numbers in the N time units.

In an implementation, a number refers to a ranking of a time unit in the N time units. For example, a number of a time unit refers to an arrangement ranking of the time unit in the N time units that are arranged in a time domain sequence. In other words, a number of a time unit may be represented by a relative number of the time unit in time units included in a synchronization signal. In another implementation, a number of a time unit may be represented by an absolute number of the time unit in a radio resource. For example, assuming that a time unit is one symbol, a number of the time unit may be represented by an absolute number of the time unit in one slot or one subframe or one radio frame.

In another implementation, resources occupied by the synchronization signal in time domain include N time units; the first time unit group includes the first L time units in time domain in the N time units; the second time unit group includes the last (N−L) time units in time domain in the N time units; and N is an integer greater than or equal to 2, and L is $\lfloor N/2 \rfloor$ or $\lceil N/2 \rceil$.

In still another implementation, resources occupied by the synchronization signal in time domain include N time units, and the first time unit is located before the second time unit in time domain.

In this implementation, the first sequence carried on the first time unit has the following three cases. In one case, when a number M1 of the first time unit in the N time units is equal to 1, the first sequence is the first complex sequence. In another case, when a number M1 of the first time unit in the N time units is greater than 1, the first sequence is a sequence obtained based on the first calculation rule and M1 first complex sequences. In still another case, when a number M1 of the first time unit in the N time units is equal to 1, the first sequence is the first complex sequence; and when the number M1 of the first time unit in the N time units is greater than 1, the first sequence is a sequence obtained based on the first calculation rule and M1 first complex sequences.

The second sequence is a sequence obtained based on the first calculation rule and M2 first complex sequences, M2 is a number of the second time unit in the N time units, and M2 is an integer greater than 1. In this implementation, the foregoing two explanations may also be used for a number of a time unit, and details are not described herein again. It can be learned that the network device sends the synchronization signal in this implementation, so that the terminal device can select, for a correlation operation, sequences carried on adjacent time units, and an obtained correlation processing result is a complex sequence. Further, the terminal may perform a correlation operation on the correlation processing result and a local sequence to obtain a sharp correlation peak, so that duration required for synchronization is shortened.

In still another implementation, N time units are classified into at least two time unit groups. The at least two time unit groups may be obtained through classification in a manner predefined in a protocol or in a signaling configuration manner (for example, classification information is indicated by using higher layer signaling and/or downlink control information). For example, the higher layer signaling may be radio resource control (RRC) signaling or media access control (MAC) signaling. For example, the downlink control information may be information carried on a downlink control channel.

A sequence carried on each time unit in each of the at least two time unit groups may have the sequence pattern of the synchronization signal in any one of the foregoing implementations. In other words, the N time units may be classified into at least two time unit groups, and for each time unit group, any one of the foregoing implementations may be used to determine a sequence carried on each time unit in the time unit group. Optionally, implementations used by the time unit groups may be the same or may be different.

In an implementation, when a channel condition is good, the terminal device may synchronize with the network device based on sequences carried on time units in one time unit group. If the channel condition is poor, the terminal device may perform a plurality of times of synchronization processing based on a plurality of time unit groups. It can be learned that reliability of synchronization signal transmission can be improved by using this implementation.

In addition, in this implementation, in the at least two time unit groups, time domain resources occupied by different time unit groups may also be consecutive or non-consecutive.

In still another implementation, the network device may send a plurality of synchronization signals, and time domain resources occupied by the synchronization signals may be consecutive or non-consecutive. Each synchronization signal may use any one of the foregoing implementations. Pattern sequences used by two synchronization signals may be the same or may be different.

In still another implementation, resources occupied by the synchronization signal in time domain are (N+K) time units. A sequence carried on each of N time units may be determined by using any one of the foregoing implementations. Sequences carried on the other K time units are not limited in this embodiment of this application.

In other words, in this embodiment disclosed in this application, even if sequences carried on some time units in the resources occupied by the synchronization signal in time domain are determined by using any one of the foregoing implementations, a correlation processing result obtained by the terminal based on the sequences carried on the some time units can still be a complex sequence. Further, a sharp correlation peak can be obtained. Sequences carried on the other time units in the resources occupied by the synchronization signal in time domain are not limited in this embodiment of this application.

According to a second aspect, this application further provides a synchronization signal transmission method. In the synchronization signal transmission method, a network device generates and sends a synchronization signal. The synchronization signal may include a constant sequence and a first sequence. A first time unit carrying the first sequence is different from a second time unit carrying the constant sequence. The first sequence may be a first complex sequence or a sequence obtained based on the first complex sequence. A correlation processing result between the constant sequence and the first sequence is a complex sequence.

Therefore, a sharper correlation peak can also be obtained by using the synchronization signal transmission method in this aspect. In this way, duration required for synchronization is shortened, and quick synchronization is implemented.

Optionally, the constant sequence may be understood as a sequence in which all sequence elements are real numbers. Optionally, absolute values of all the sequence elements included in the constant sequence are equal.

According to a third aspect, this application further provides a synchronization signal transmission method. The synchronization signal transmission method is described from a perspective of a terminal device. The terminal device may receive a synchronization signal from a network device. The synchronization signal includes a first sequence and a second sequence, and a first time unit carrying the first sequence is different from a second time unit carrying the second sequence; the first sequence is a first complex sequence or a sequence obtained based on the first complex sequence, and the second sequence is a sequence obtained based on the first complex sequence; and the first sequence is different from the second sequence, and a correlation processing result between the first sequence and the second sequence is a complex sequence. Therefore, the terminal device can obtain a sharp correlation peak based on the correlation processing result when synchronizing with the network device, so that duration required for synchronization is shortened.

In this aspect, for related content of the first sequence and the second sequence and various optional implementations of the synchronization signal, refer to the related content in the first aspect. Details are not described herein again.

According to a fourth aspect, this application further provides a synchronization signal transmission method. In the synchronization signal transmission method, a terminal device receives a synchronization signal from a network device, and synchronizes with the network device based on the synchronization signal. The synchronization signal may include a constant sequence and a first sequence. A first time unit carrying the first sequence is different from a second time unit carrying the constant sequence. The first sequence may be a first complex sequence or a sequence obtained based on the first complex sequence. A correlation processing result between the constant sequence and the first sequence is a complex sequence. Therefore, a sharper correlation peak can also be obtained by using the synchronization signal transmission method in this aspect. In this way, duration required for synchronization is shortened, and quick synchronization is implemented.

In this aspect, for related content of the first complex sequence, refer to the related descriptions in the first aspect. Details are not described herein again.

According to a fifth aspect, this application further provides a communications apparatus. The communications apparatus implements some or all functions of the network device described in either of the first aspect and the second aspect. For example, a function of the apparatus may include functions in some or all embodiments of the network device in this application, or may include a function of separately implementing any one of the embodiments of this application. The function may be implemented by hardware, or may be implemented by hardware executing corresponding software. The hardware or the software includes one or more units or modules corresponding to the function.

In a possible design, a structure of the communications apparatus includes a processing unit and a communications unit. The processing unit is configured to support the communications apparatus in performing a corresponding function in the foregoing methods. The communications unit is configured to support communication between the communications apparatus and another device. The communications apparatus may further include a storage unit. The storage unit is configured to be coupled to the processing unit and the communications unit, and the storage unit stores program instructions and data that are necessary for the communications apparatus.

In an implementation, the communications apparatus includes a processing unit, configured to generate a synchronization signal, where the synchronization signal includes a first sequence and a second sequence, and a communications unit, configured to send the synchronization signal.

A first time unit carrying the first sequence is different from a second time unit carrying the second sequence; and the first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

In an implementation, the first sequence is a sequence obtained based on the first complex sequence and a first calculation rule; the second sequence is a sequence obtained based on the first complex sequence and the first calculation rule; and the first calculation rule includes any one of a point multiplication rule, a conjugate point multiplication rule, and a conjugate point division rule.

In an implementation, resources occupied by the synchronization signal in time domain include a first time unit group and a second time unit group; the first time unit is any time unit in the first time unit group; and the second time unit is any time unit in the second time unit group.

In an implementation, the resources occupied by the synchronization signal in time domain include N time units, and N is an integer greater than or equal to 2; the first time unit group includes time units whose numbers are odd numbers in the N time units; and the second time unit group includes time units whose numbers are even numbers in the N time units.

In another implementation, the resources occupied by the synchronization signal in time domain include N time units; the first time unit group includes the first L time units in time domain in the N time units; the second time unit group includes the last (N−L) time units in time domain in the N time units; and N is an integer greater than or equal to 2, and L is $\lfloor N/2 \rfloor$ or $\lceil N/2 \rceil$.

In still another implementation, resources occupied by the synchronization signal in time domain include N time units, and the first time unit is located before the second time unit in time domain; when a number M1 of the first time unit in the N time units is equal to 1, the first sequence is the first complex sequence; or when the number M1 of the first time unit in the N time units is greater than 1, the first sequence is a sequence obtained based on the first calculation rule and M1 first complex sequences; and the second sequence is a sequence obtained based on the first calculation rule and M2 first complex sequences, M2 is a number of the second time unit in the N time units, and M2 is an integer greater than 1.

In still another implementation, the second sequence is obtained by applying the first calculation rule to the first sequence and the first complex sequence, and the second time unit is a time unit adjacent to the first time unit.

In an implementation, the first complex sequence is a ZC sequence; or the first complex sequence is a sequence obtained by performing inverse fast Fourier transformation (IFFT) or fast Fourier transformation (FFT) on the ZC sequence, an m sequence, or a gold sequence.

In this aspect, for other related content of the first sequence and the second sequence and various optional implementations of the synchronization signal, refer to the related content in the first aspect. Details are not described herein again.

In an example, the communications unit may be a transceiver or a communications interface, the storage unit may be a memory, and the processing unit may be a processor.

In an implementation, the communications apparatus includes:
 a processor, configured to generate a synchronization signal, where the synchronization signal includes a first sequence and a second sequence; and
 a transceiver, configured to send the synchronization signal.

A first time unit carrying the first sequence is different from a second time unit carrying the second sequence; and the first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

In this aspect, for related content of the first sequence and the second sequence and various optional implementations of the synchronization signal, refer to the related content in the first aspect. Details are not described herein again.

In an implementation process, the processor may be configured to perform, for example, but not limited to, baseband related processing; and the transceiver may be configured to perform, for example, but not limited to, radio frequency receiving and sending. The foregoing components may be separately disposed on chips independent of each other, or at least a part or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, an increasing quantity of components may be integrated onto a same chip. For example, a digital baseband processor and a plurality of processors (including but not limited to a graphics processing unit, a multimedia processor, and the like) may be integrated onto a same chip. Such a chip may be referred to as a system on chip. Whether the components are separately disposed on different chips or integrated and disposed on one or more chips usually depends on a requirement for a product design. Implementation forms of the foregoing components are not limited in this embodiment of this application.

According to a sixth aspect, this application further provides a communications apparatus. The communications apparatus implements some or all functions of the terminal in the method example described in either of the third aspect and the fourth aspect. For example, a function of the communications apparatus may include functions in some or all embodiments of this application, or may include a function of separately implementing any one of the embodiments of this application. The function may be implemented by hardware, or may be implemented by hardware executing corresponding software. The hardware or the software includes one or more units or modules corresponding to the function.

In a possible design, a structure of the communications apparatus includes a processing unit and a communications unit. The processing unit is configured to support the communications apparatus in performing a corresponding function in the foregoing methods. The communications unit is configured to support communication between the communications apparatus and another device. The communications apparatus may further include a storage unit. The storage unit is configured to be coupled to the processing unit and a sending unit, and the storage unit stores program instructions and data that are necessary for the communications apparatus.

In an implementation, the communications apparatus includes:
 a communications unit, configured to receive a synchronization signal from a network device; and
 a processing unit, configured to synchronize with the network device based on the synchronization signal.

A first time unit carrying a first sequence is different from a second time unit carrying a second sequence.

The first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

In an implementation, the first sequence is a sequence obtained based on the first complex sequence and a first calculation rule; the second sequence is a sequence obtained based on the first complex sequence and the first calculation rule; and the first calculation rule includes any one of a point multiplication rule, a conjugate point multiplication rule, and a conjugate point division rule.

In an implementation, resources occupied by the synchronization signal in time domain include a first time unit group and a second time unit group; the first time unit is any time unit in the first time unit group; and the second time unit is any time unit in the second time unit group.

In an implementation, the resources occupied by the synchronization signal in time domain include N time units, and N is an integer greater than or equal to 2; the first time unit group includes time units whose numbers are odd numbers in the N time units; and the second time unit group includes time units whose numbers are even numbers in the N time units.

In another implementation, the resources occupied by the synchronization signal in time domain include N time units; the first time unit group includes the first L time units in time domain in the N time units; the second time unit group includes the last (N−L) time units in time domain in the N time units; and N is an integer greater than or equal to 2, and L is $\lfloor N/2 \rfloor$ or $\lceil N/2 \rceil$.

In still another implementation, resources occupied by the synchronization signal in time domain include N time units, and the first time unit is located before the second time unit in time domain; when a number M1 of the first time unit in the N time units is equal to 1, the first sequence is the first complex sequence; or when the number M1 of the first time unit in the N time units is greater than 1, the first sequence is a sequence obtained based on the first calculation rule and M1 first complex sequences; and the second sequence is a sequence obtained based on the first calculation rule and M2 first complex sequences, M2 is a number of the second time unit in the N time units, and M2 is an integer greater than 1.

In still another implementation, the second sequence is obtained by applying the first calculation rule to the first sequence and the first complex sequence, and the second time unit is a time unit adjacent to the first time unit.

In an implementation, the first complex sequence is a ZC sequence; or the first complex sequence is a sequence obtained by performing inverse fast Fourier transformation (IFFT) or fast Fourier transformation (FFT) on the ZC sequence, an m sequence, or a gold sequence.

In addition, in this aspect, for other related content of the first sequence and the second sequence and various optional implementations of the synchronization signal, refer to the related content in the first aspect. Details are not described herein again.

For example, the processing unit may be a processor, the communications unit may be a transceiver or a communications interface, and the storage unit may be a memory.

In an implementation, the communications apparatus includes:
  a transceiver, configured to receive a synchronization signal from a network device; and
  a processor, configured to synchronize with the network device based on the synchronization signal.

A first time unit carrying a first sequence is different from a second time unit carrying a second sequence.

The first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

In this aspect, for related content of the first sequence and the second sequence and various optional implementations of the synchronization signal, refer to the related content in the first aspect. Details are not described herein again.

According to a seventh aspect, this application further provides a processor, configured to perform the foregoing methods. In a process of performing these methods, a process of sending the foregoing information and a process of receiving the foregoing information in the foregoing methods may be understood as a process of outputting the foregoing information by the processor and a process of receiving the foregoing input information by the processor. When outputting the information, the processor outputs the information to a transceiver, so that the transceiver transmits the information. After the information is output by the processor, other processing may further need to be performed on the information before the information arrives at the transceiver. Similarly, when the processor receives the input information, the transceiver receives the information and inputs the information into the processor. Still further, after the transceiver receives the information, other processing may need to be performed on the information before the information is input into the processor.

Based on the foregoing principle, for example, sending a synchronization signal mentioned in the foregoing methods may be understood as outputting the synchronization signal by the processor. For another example, receiving a synchronization signal may be understood as receiving an input synchronization signal by the processor.

In this case, for operations such as transmission, sending, and receiving related to the processor, if there is no particular statement, or if the operations do not contradict an actual function or internal logic of the operations in related descriptions, the operations may be more generally understood as operations such as input, receiving, and output of the processor, instead of operations such as transmission, sending, and receiving directly performed by a radio frequency circuit and an antenna.

In an implementation process, the processor may be a processor specially configured to perform these methods, or a processor, for example, a general-purpose processor, configured to execute computer instructions in a memory to perform these methods. The memory may be a non-transitory memory, for example, a read-only memory (ROM). The memory and the processor may be integrated into a same chip, or may be separately disposed on different chips. A type of the memory and a manner of disposing the memory and the processor are not limited in the embodiments of this application.

According to an eighth aspect, this application further provides a communications system. The system includes at least one terminal device and at least one network device in the foregoing aspects. In another possible design, the system may further include another device interacting with the terminal or the network device in the solutions provided in this application.

According to a ninth aspect, this application provides a computer-readable storage medium, configured to store computer software instructions. When the instructions are executed by a communications apparatus, the method according to either of the third aspect and the fourth aspect is implemented.

According to a tenth aspect, this application provides a computer-readable storage medium, configured to store computer software instructions. When the instructions are executed by a communications apparatus, the communications apparatus implements the method according to the first aspect or the second aspect.

According to an eleventh aspect, this application further provides a computer program product including instructions. When the computer program product runs on a communications apparatus, the communications apparatus performs the method according to the first aspect or the second aspect.

According to a twelfth aspect, this application further provides a computer program product including instructions. When the computer program product runs on a communications apparatus, the communications apparatus performs the method according to the third aspect or the fourth aspect.

According to a thirteenth aspect, this application provides a chip system. The chip system includes a processor and an interface, the interface is configured to obtain a program or instructions, and the processor is configured to invoke the program or the instructions to implement or support a network device in implementing functions in either of the first aspect and the second aspect, for example, determine or process at least one of data or information in the foregoing methods. In a possible design, the chip system further includes a memory, and the memory is configured to store program instructions and data that are necessary for the network device. The chip system may include a chip, or may include a chip and another discrete device.

According to a fourteenth aspect, this application provides a chip system. The chip system includes a processor and an interface, the interface is configured to obtain a program or instructions, and the processor is configured to invoke the program or the instructions to implement or support a terminal device in implementing functions in the third aspect and the fourth aspect, for example, determine or process at least one of data or information in the foregoing methods. In a possible design, the chip system further includes a memory, and the memory is configured to store program instructions and data that are necessary for the network device. The chip system may include a chip, or may include a chip and another discrete device.

DESCRIPTION OF EMBODIMENTS

Figure 1:
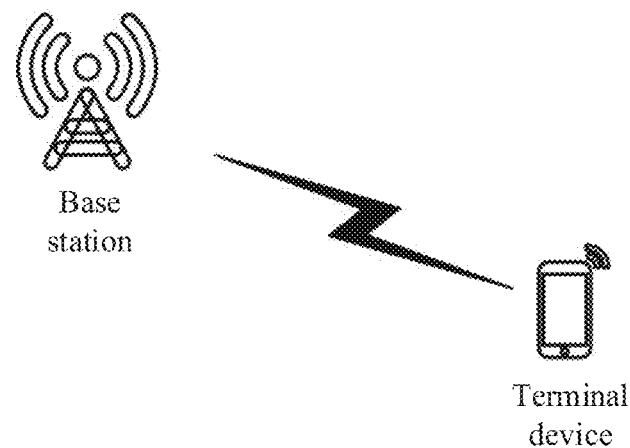
FIG. 1 is a schematic diagram of a communications system according to an embodiment of this application.

The following describes technical solutions of this application with reference to the accompanying drawings.

The technical solutions of this application may be applied to various communications systems. For example, with continuous development of communications technologies, the technical solutions of this application may be applied to a 5G system, which may also be referred to as a new radio (NR) system, or may be applied to a device to device (D2D) system, a machine to machine (M2M) system, a future communications system, or the like.

A network architecture and a service scenario that are described in the embodiments disclosed in this application are intended to more clearly describe the technical solutions in the embodiments disclosed in this application, and do not constitute a limitation on the technical solutions provided in the embodiments disclosed in this application. A person of ordinary skill in the art may know that with evolution of the network architecture and emergence of new service scenarios, the technical solutions provided in the embodiments disclosed in this application are also applicable to similar technical problems.

In this application, a network device may be any device with a wireless transceiving function or a chip that may be disposed in the device. The network device includes but is not limited to an evolved NodeB (eNB), a radio network controller (RNC), a NodeB (NB), a base station controller (BSC), a base transceiver station (BTS), a home base station (for example, home evolved NodeB or home NodeB, HNB), a baseband unit (BBU), an access point (AP) in a wireless fidelity (Wi-Fi) system, a wireless relay node, a wireless backhaul node, a transmission point (transmission and reception point, TRP or transmission point, TP), and the like, or may be a device used in a 5G, 6G, or even 7G system, for example, a gNB or a transmission point (TRP or TP) in an NR system, or one antenna panel or one group of antenna panels (including a plurality of antenna panels) of a gNB in a 5G system, or may be a network node included in a gNB or a transmission point, for example, a baseband unit (BBU), a distributed unit (DU, distributed unit), a picocell, a femtocell, or a road side unit (RSU) in a vehicle-to-everything (V2X) or smart driving scenario.

In some deployments, the gNB or the transmission point may include a centralized unit (CU) and a DU. The gNB may further include a radio frequency unit (radio unit, RU). The CU implements some functions of the gNB or the transmission point, and the DU implements some functions of the gNB or the transmission point. For example, the CU implements functions of a radio resource control (RRC) layer and a packet data convergence protocol (PDCP) layer, and the DU implements functions of a radio link control (RLC) layer, a media access control (MAC) layer, and a physical (PHY) layer. Information at the RRC layer eventually becomes information at the PHY layer, or is converted from information at the PHY layer. Therefore, in this architecture, higher layer signaling, for example, RRC layer signaling or PDCP layer signaling, may also be considered as being sent by the DU or sent by the DU and the RU. It may be understood that the network device may be a CU node, a DU node, or a device including the CU node and the DU node. In addition, the CU may serve as a network device in a radio access network (RAN), or the CU may serve as a network device in a core network (CN). This is not limited herein.

In this application, a terminal device may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus, and may be applied to a 5G, 6G, or even 7G system. The terminal device in the embodiments of this application may be a mobile phone, a tablet computer (Pad), a computer with a wireless transceiving function, a virtual reality (VR) terminal device, an augmented reality (AR) terminal device, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, a wireless terminal or an RSU of a wireless terminal type in V2X (vehicle-to-everything), or the like.

To facilitate understanding of the embodiments disclosed in this application, the following points are described.

(1) In the embodiments disclosed in this application, an NR network scenario in a wireless communications network is used as an example of some scenarios for description. It should be noted that the solutions in the embodiments disclosed in this application may be further applied to another wireless communications network, and a corresponding name may also be replaced with a name of a corresponding function in the another wireless communications network.

(2) In the embodiments disclosed in this application, all aspects, embodiments, or features of this application are presented by describing a system including a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

(3) In the embodiments disclosed in this application, the word "example" is used to represent giving an example, an illustration, or a description. Any embodiment or design scheme described as an "example" in this application should not be explained as being more preferred or having more advantages than another embodiment or design scheme. For example, the word "example" is used to present a concept in a specific manner.

(4) In the embodiments disclosed in this application, "of", "relevant", and "corresponding" may be interchangeably used sometimes. It should be noted that expressed meanings are consistent when differences are not emphasized.

(5) In the embodiments disclosed in this application, at least one may be further described as one or more, and a plurality of may be two, three, four, or more. This is not limited in this application. In the embodiments disclosed in this application, "first", "second", "third", "A", "B", "C", "D", and the like are used for distinguishing between technical features described by them. There is no chronological order or no size order between the technical features described by "first", "second", "third", "A", "B", "C", and "D".

To facilitate understanding of the embodiments disclosed in this application, some terms involved are briefly described.

1. Time Unit

In the embodiments disclosed in this application, the time unit may be one or more radio frames, one or more subframes, one or more slots, one or more mini slots, or one or more symbols, or may be a time window including a plurality of frames or subframes, for example, a system information (SI) window. A time length of one symbol is not limited in the embodiments of this application. A length of one symbol may vary for different subcarrier spacings. Symbols may include an uplink symbol and a downlink symbol. The uplink symbol may be referred to as a single-carrier frequency division multiple access (SC-FDMA) symbol or an orthogonal frequency division multiplexing (OFDM) symbol. The downlink symbol may be referred to as an OFDM symbol.

2. Complex Sequence

The complex sequence is a sequence that includes M elements and in which at least one element is a complex number. M is an integer greater than or equal to 2.

3. Local Sequence

The local sequence is a base sequence stored on a side of a terminal device. The terminal device may perform operation processing on the local sequence and a signal received from a network device, to synchronize with the network device. Optionally, the terminal device may further obtain identification information of the network device through the operation processing. For example, the identification information of the network device may be a cell identity (cell identification, Cell ID). The terminal device may perform a correlation operation on the local sequence and a processed synchronization signal sent by the network device, to obtain a correlation peak to synchronize with the network device.

4. Correlation Operation

Two correlation operations are involved in the embodiments disclosed in this application.

The first correlation operation is that point multiplication, point division, conjugate point multiplication, or conjugate point division is performed on corresponding elements of two sequences and then a sequence is obtained.

In the embodiments disclosed in this application, a correlation processing result between a first sequence and a second sequence in a synchronization signal is obtained based on the first correlation operation.

The second correlation operation is that corresponding elements of two sequences are multiplied and then products are added to obtain a value. The value may be a complex number, or may be a real number.

That corresponding elements of two sequences are multiplied may be that the corresponding elements of the two sequences are directly multiplied, or conjugates of the corresponding elements of the two sequences are multiplied, or an element of one sequence and a conjugate of an element of the other sequence are multiplied.

It can be learned that a result of the first correlation operation is a sequence, and a result of the second correlation operation is a value.

For example, it is assumed that the first sequence is $\{x_1, x_2, x_3, \ldots, x_m\}$, and the second sequence is $\{y_1, y_2, y_3, \ldots, y_m\}$, where m is a quantity of elements of each sequence. At least one element in the first sequence is a complex number, and at least one element in the second sequence is also a complex number.

In an example in which the first correlation operation is point multiplication of corresponding elements, a correlation operation result between the first sequence and the second sequence is $\{x_1y_1, x_2y_2, x_3y_3, \ldots, x_my_m\}$. It can be learned that the correlation operation result is still a complex sequence.

Based on the second correlation operation, a correlation operation result between the first sequence and the second sequence is $x_1y_1+x_2y_2+x_3y_3+\ldots+x_my_m$. It can be learned that the correlation operation result is a value.

FIG. 1 is used as an example in the embodiments disclosed in this application, to describe a synchronization signal transmission method. FIG. 1 is a schematic diagram of a wireless communications system according to an embodiment disclosed in this application. As shown in FIG. 1, the wireless communications system may include one or more network devices (for example, one or more base stations) and one or more terminal devices. The network device may be configured to communicate, under control of a network device controller (not shown), with the terminal by using a wireless interface. In some embodiments, the network device controller may be a part of a core network, or may be integrated into the network device. The network device may be configured to transmit control information or user data to the core network through a backhaul interface. The device form shown in FIG. 1 is used as an example. In other words, the network device is not limited to a base station, and the terminal device is not limited to a mobile phone.

As shown in FIG. 1, the network device communicates with the terminal device by using the wireless interface or an air interface. When communicating with the network device, the terminal device further needs to synchronize with the network device. Therefore, a synchronization signal can be designed in this application. The network device sends the synchronization signal to the terminal device. The terminal device may synchronize with the network device based on the synchronization signal.

In the embodiments disclosed in this application, the synchronization signal includes a first sequence and a second sequence. The first sequence is a first complex sequence or a sequence obtained based on the first complex sequence, and the second sequence is a sequence obtained based on the first complex sequence. The first sequence is different from the second sequence, and a correlation processing result between the first sequence and the second sequence is a complex sequence.

In an implementation, the first complex sequence is a Zadoff-Chu (ZC) sequence; or the first complex sequence is a sequence obtained by performing inverse fast Fourier transformation (IFFT) or fast Fourier transformation (FFT) on the ZC sequence, an m sequence, or a gold sequence.

In another implementation, the first complex sequence may be a sequence obtained through transformation of a complex sequence. The complex sequence may include a ZC sequence or a sequence obtained by performing IFFT or FFT on the ZC sequence, an m sequence, or a gold sequence. For example, a sequence obtained after cyclic shift expansion is performed on the complex sequence is used as the first complex sequence. Alternatively, a sequence obtained after some elements are cut off from the complex sequence is used as the first complex sequence. Alternatively, a conjugate sequence of the complex sequence is used as the first complex sequence. Alternatively, a sequence obtained after phase rotation is performed on the complex sequence (in other words, each element of the sequence rotates a given phase) is used as the first complex sequence. Alternatively, a sequence obtained after multiplication, conjugate multiplication, addition, modulo-2 addition, or the like is performed on a plurality of complex sequences may be used as the first complex sequence.

It should be noted that a sequence type of the first complex sequence or the complex sequence is not limited in the embodiments of this application, and the first complex sequence is a sequence whose sequence length is greater than 1 and in which at least one element is a complex number. That the sequence length is greater than 1 may mean that a quantity of elements included in the sequence is greater than 1.

In the embodiments of this application, because the first sequence and the second sequence are sequences obtained based on a same first complex sequence, performing correlation processing on the first sequence and the second sequence can offset impact on synchronization estimation performance that is imposed by an initial large frequency offset caused by poor crystal oscillator stability.

In addition, the foregoing local sequence may be a first complex sequence. Both the correlation processing result between the first sequence and the second sequence and the local sequence are complex sequences. Because the complex sequence has a good autocorrelation property, a sharp correlation peak can be obtained when a correlation operation is performed on the correlation processing result and the local sequence, so that synchronization duration is shortened, in other words, time required for synchronization between the terminal and the network device is shortened.

Figure 2A:
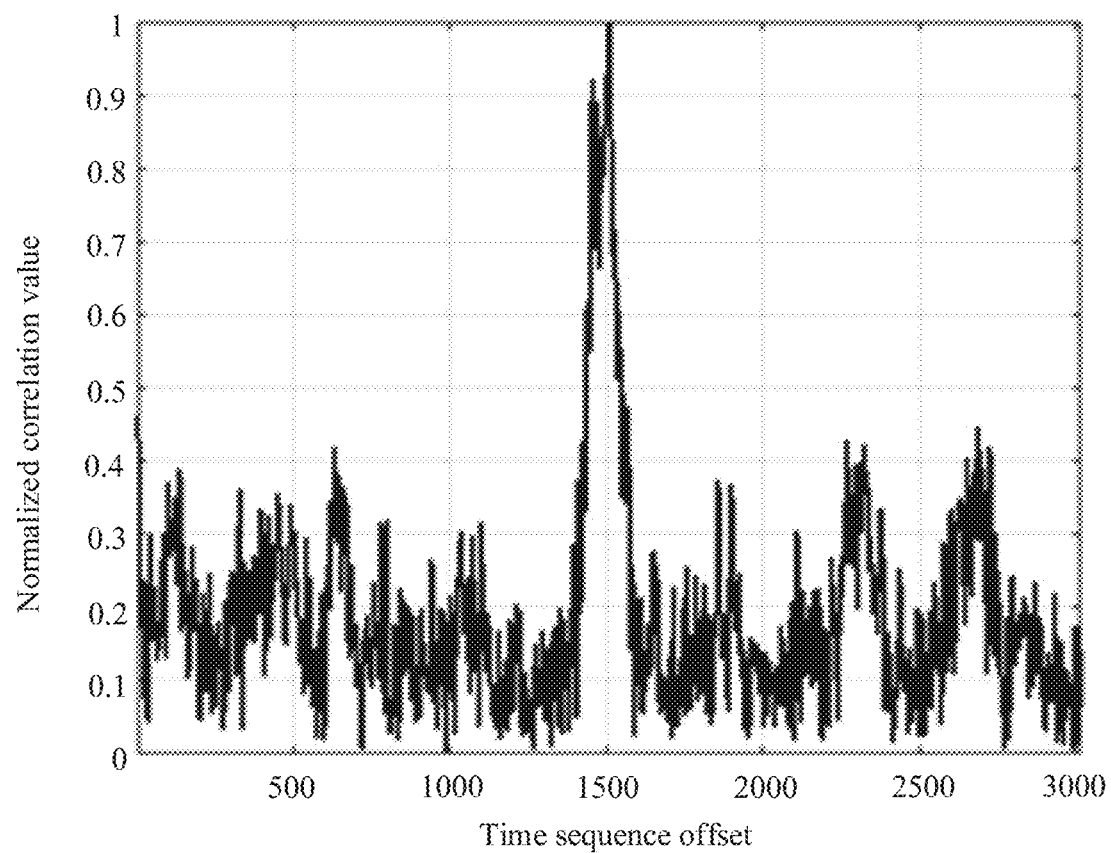
FIG. 2a and FIG. 2b are schematic diagrams of simulation of a correlation peak of a synchronization signal according to an embodiment of this application.
Figure 2B:
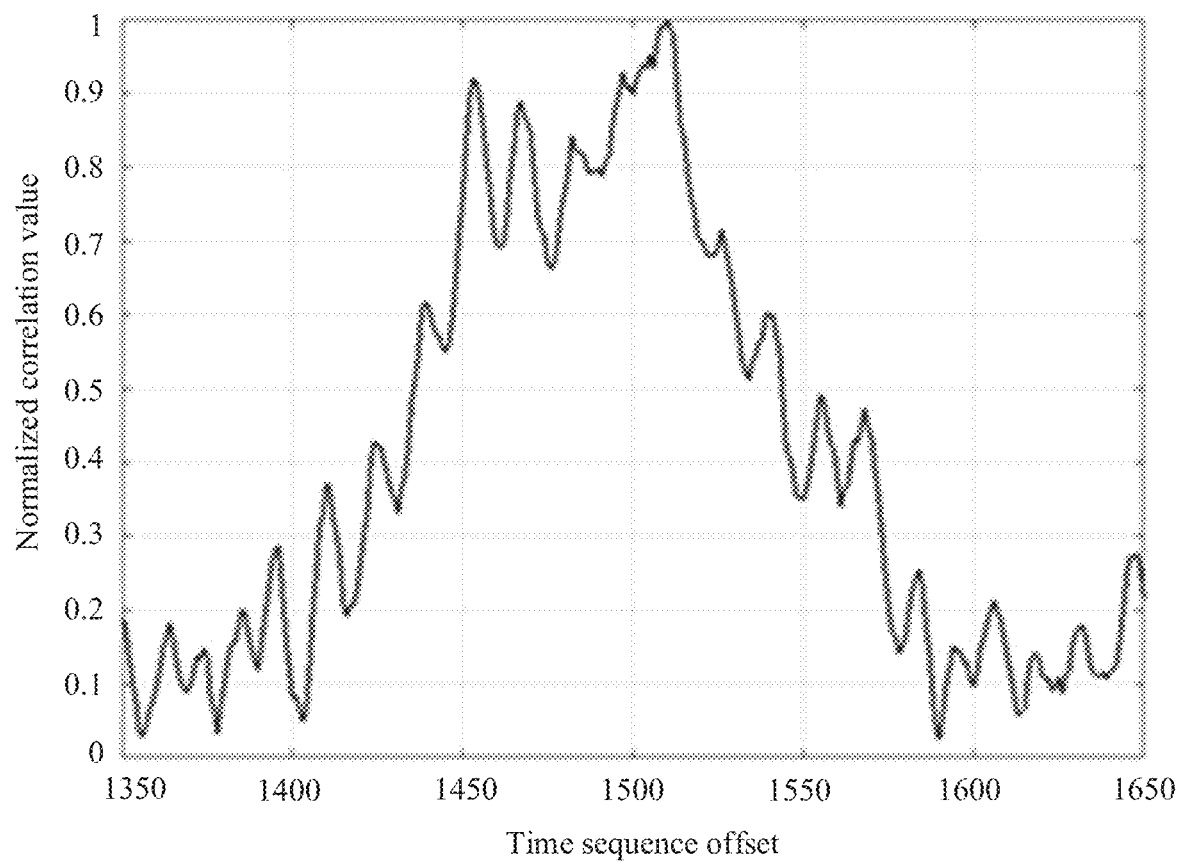

Generally, a correlation processing result between two sequences included in a synchronization signal is a sequence including +1 and −1. Because the sequence including +1 and −1 has a poor autocorrelation property, a correlation peak is not sharp enough when a correlation operation is performed on the sequence and a local sequence. It is assumed that an initial frequency offset error is 20 parts per million (20 ppm), and a center frequency of a system is 900 MHz. A time-domain correlation property of the synchronization signal on an additive white Gaussian noise channel is shown in FIG. 2a. A horizontal axis is a time sequence offset, and a vertical axis is a normalized correlation value. Based on FIG. 2a, it can be observed that, in a case of a frequency offset error, although there is a correlation peak feature, as shown in FIG. 2b, the correlation peak is not steep enough when the correlation peak is magnified, resulting in low synchronization accuracy and relatively long synchronization duration required.

Figure 3A:
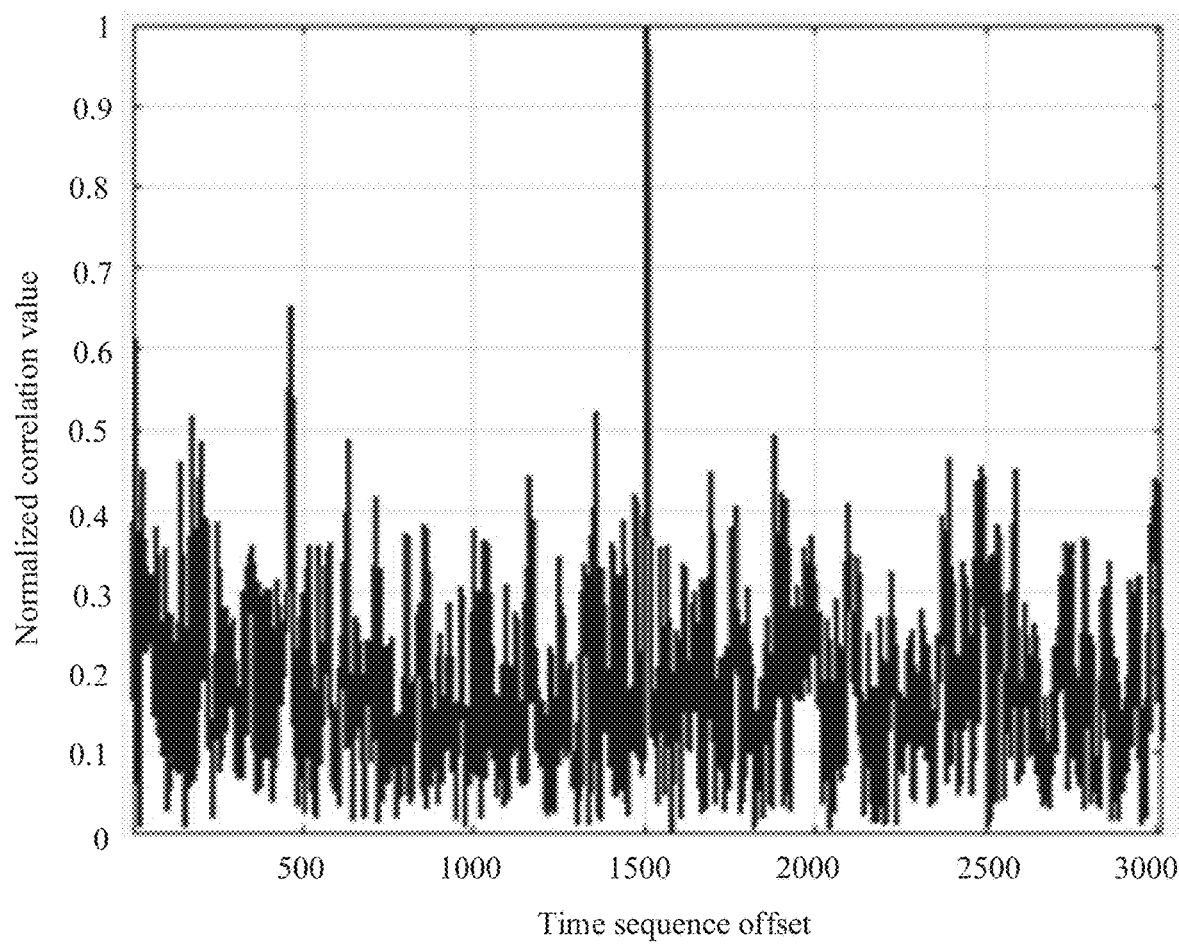
FIG. 3a and FIG. 3b are schematic diagrams of simulation of a correlation peak of a synchronization signal according to an embodiment of this application.
Figure 3B:
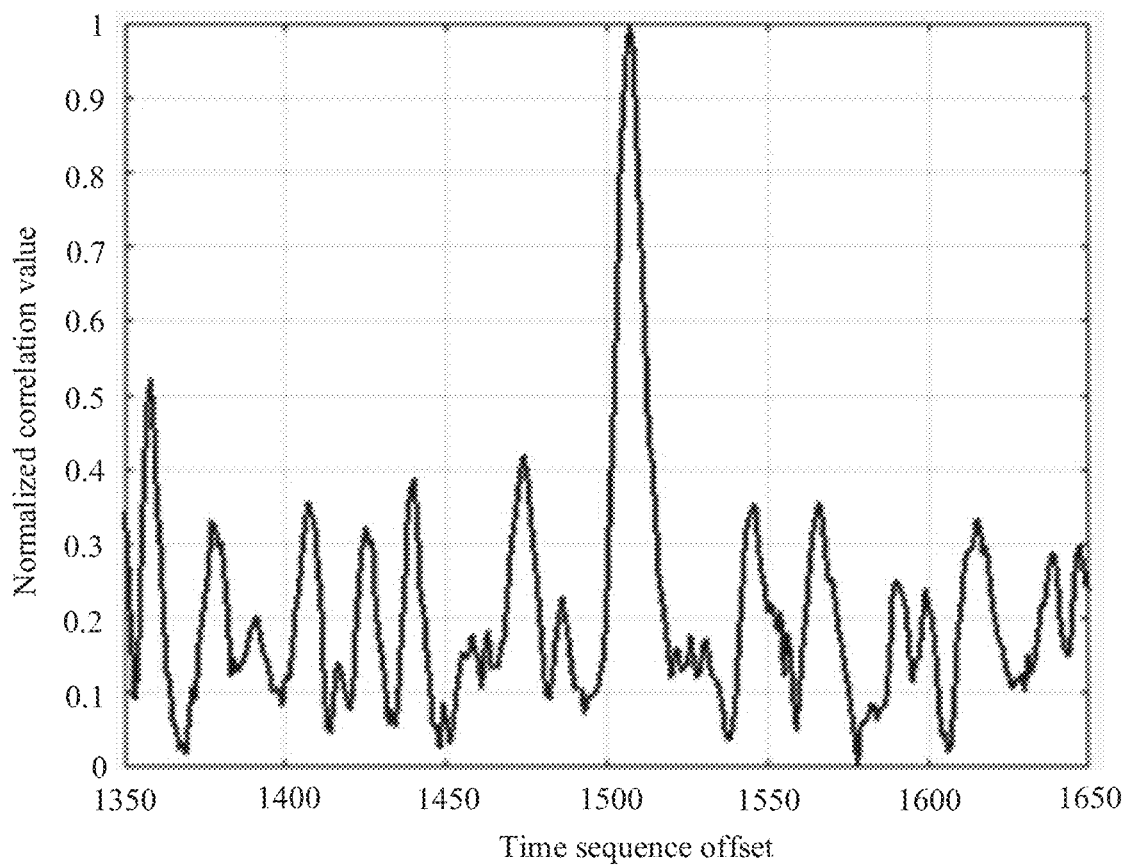

As shown in FIG. 3a and FIG. 3b, a correlation processing result between two sequences in a synchronization signal in this application is a complex sequence, for example, the foregoing sequence including +1 and −1, and the sequence has a better autocorrelation property. Therefore, in a same simulation condition as in FIG. 2b, FIG. 3b has a sharper correlation peak, so that duration required for synchronization can be shortened.

A normalized correlation value represented by a vertical axis may be calculated by using the following steps. It is assumed that there are two sequences: a sequence X and a sequence Y. A correlation operation is performed on the sequence X and the sequence Y according to the second correlation operation described above, to obtain a value. When the second correlation operation is performed, an obtained result of the second correlation operation varies with corresponding elements of the sequence X and the sequence Y All possible correlation operation results between the sequence X and the sequence Y are obtained by changing corresponding elements and by using the second correlation operation. A correlation operation result with a largest modulus value is selected from all the possible correlation operation results, and modulus values of all the possible correlation operation results are divided by the largest modulus value. An obtained result is the normalized correlation value.

All the possible correlation operation results between the sequence X and the sequence Y may be correlation operation results obtained by performing the second correlation operation on at least one element in the sequence X and the sequence Y, or correlation operation results obtained by performing the second correlation operation on the sequence X and at least one sequence element in the sequence Y. In the embodiments of this application, a modulus value of a complex number is obtained by calculating a square root of a sum of squares of a real part and an imaginary part of the complex number. A modulus value of a real number is the real number or an absolute value of the real number.

With reference to the accompanying drawings, the following describes the synchronization signal transmission method in the embodiments disclosed in this application.

In the embodiments disclosed in this application, a first sequence is a sequence transmitted on a first time unit, and a second sequence is a sequence transmitted on a second time unit. Resources occupied by a synchronization signal in time domain include N time units, and the N time units include the first time unit and the second time unit. N is an integer greater than or equal to 2.

In an implementation, the first sequence is directly a first complex sequence, for example, various complex sequences described in the part of terms. In another implementation, the first sequence is a sequence obtained based on the first complex sequence and a first calculation rule. The second sequence is a sequence obtained based on the first complex sequence and the first calculation rule.

In an implementation, the first calculation rule includes any one of a point multiplication rule, a conjugate point multiplication rule, and a conjugate point division rule. The first calculation rule is a calculation rule between corresponding elements of sequences, and a* represents calculating a conjugate of a or represents a conjugate of a. The following describes examples of the first correlation operation or various calculation rules included in the first calculation rule.

For example, it is assumed that a sequence A is $\{x_1, x_2, x_3, \ldots, x_m\}$, and a sequence B is $\{y_1, y_2, y_3, \ldots, y_m\}$.

A calculation result of applying a point multiplication rule to the sequence A and the sequence B is:

$$A.{}^*B = \{x_1 y_1, x_2 y_2, x_3 y_3, \ldots, x_m y_m\}.$$

A calculation result of applying a conjugate point multiplication rule to the sequence A and the sequence B is:

$$A^*.{}^*B = \{x_1^* y_1, x_2^* y_2, x_3^* y_3, \ldots, x_m^* y_m\} \text{ or } \{y_1^* x_1, y_2^* x_2, y_3^* x_3, \ldots, y_m^* x_m\}.$$

A calculation result of applying a conjugate point division rule to the sequence A and the sequence B is:

$$A^*./B = \{x_1^*/y_1, x_2^*/y_2, x_3^*/y_3, \ldots, x_m^*/y_m\},$$

$$A^*./B = \{y_1^*/x_1, y_2^*/x_2, y_3^*/x_3, \ldots, y_m^*/x_m\},$$

$$A^*./B = \{y_1/x_1^*, y_2/x_2^*, y_3/x_3^*, \ldots, y_m/x_m^*\}, \text{ or}$$

$$A^*./B = \{x_1/y_1^*, x_2/y_2^*, x_3/y_3^*, \ldots, x_m/y_m^*\}.$$

The first calculation rule and the first correlation operation can enable a correlation operation result between the first sequence and the second sequence to be a complex sequence. For ease of description, the first complex sequence is denoted as a sequence Z below.

For example, the first calculation rule is a point multiplication rule. The first sequence may be $Z.{}^*Z$, where Z represents the sequence Z, and the second sequence may be $Z.{}^*Z.{}^*Z$. If the first correlation operation is a point division rule, the correlation processing result between the first sequence and the second sequence is $(Z.{}^*Z.{}^*Z)./(Z.{}^*Z)=Z$. If the first correlation operation is a conjugate point multiplication rule, the correlation processing result between the first sequence and the second sequence is $Z.{}^*Z.{}^*Z.{}^*Z^*.{}^*Z^*=Z$ or $Z.{}^*Z.{}^*Z.{}^*Z^*.{}^*Z^*=c^*Z$, where c is a constant, and $Z^*$ represents calculating a conjugate of each sequence element included in Z or represents a conjugate of Z.

For another example, the first calculation rule is a conjugate point multiplication rule. The first sequence may be $Z.{}^*Z^*$, and the second sequence may be $Z.{}^*Z^*.{}^*Z^*$. If the first correlation operation is a point division rule, the correlation processing result between the first sequence and the second sequence is $(Z.{}^*Z^*.{}^*Z^*)./(Z.{}^*Z^*)=Z$. If the first correlation operation is a conjugate point multiplication rule, the correlation processing result between the first sequence and the second sequence is $Z.{}^*Z^*.{}^*(Z.{}^*Z^*.{}^*Z^*)^*=Z$ or $Z.{}^*Z^*.{}^*(Z.{}^*Z^*.{}^*Z^*)^*=c^*Z$, where c is a constant, and $Z^*$ represents calculating a conjugate of each element in the sequence Z.

For still another example, the first calculation rule is a conjugate point division rule. The first sequence may be $Z./Z^*$, and the second sequence may be $Z./(Z^*.{}^*Z^*)$. If the first correlation operation is a point division rule, the correlation processing result between the first sequence and the second sequence is $(Z./Z^*)./(Z./(Z^*.{}^*Z^*))=Z^*$.

It should be noted that when the first sequence is a sequence obtained based on the first complex sequence and the first calculation rule, a quantity of times the first calculation rule is applied in a process of generating the first sequence is not limited in the embodiments of this application. It may be understood that, provided that the first complex sequence is used and the first calculation rule is applied at least once in the process of generating the first sequence, the first sequence may be considered as a sequence obtained based on the first complex sequence and the first calculation rule. Descriptions are the same for the second sequence, and details are not described herein again.

Optional implementations of the synchronization signal are described with reference to FIG. 4 to FIG. 13. In the embodiments disclosed in this application, the N time units may be consecutive or non-consecutive in time domain. The following implementations are described by using consecutive time units as an example. For non-consecutive time units, a sequence carried on each time unit may also use the following implementations shown in FIG. 4 to FIG. 13.

In an implementation, the N time units are classified into at least two time unit groups. The at least two time unit groups may be obtained through classification in a manner predefined in a protocol or in an RRC configuration manner. The at least two time unit groups include a first time unit group and a second time unit group. The first time unit is any time unit in the first time unit group, and the second time unit is any time unit in the second time unit group.

In an implementation, the first time unit group includes time units whose numbers are odd numbers in the N time units. The second time unit group includes time units whose numbers are even numbers in the N time units.

In an implementation, a number refers to a ranking of a time unit in the N time units. For example, a number of a time unit refers to an arrangement ranking of the time unit in the N time units that are arranged in a time domain sequence. In other words, a number of a time unit may be represented by a relative number of the time unit in time units included in a synchronization signal.

Figure 4:
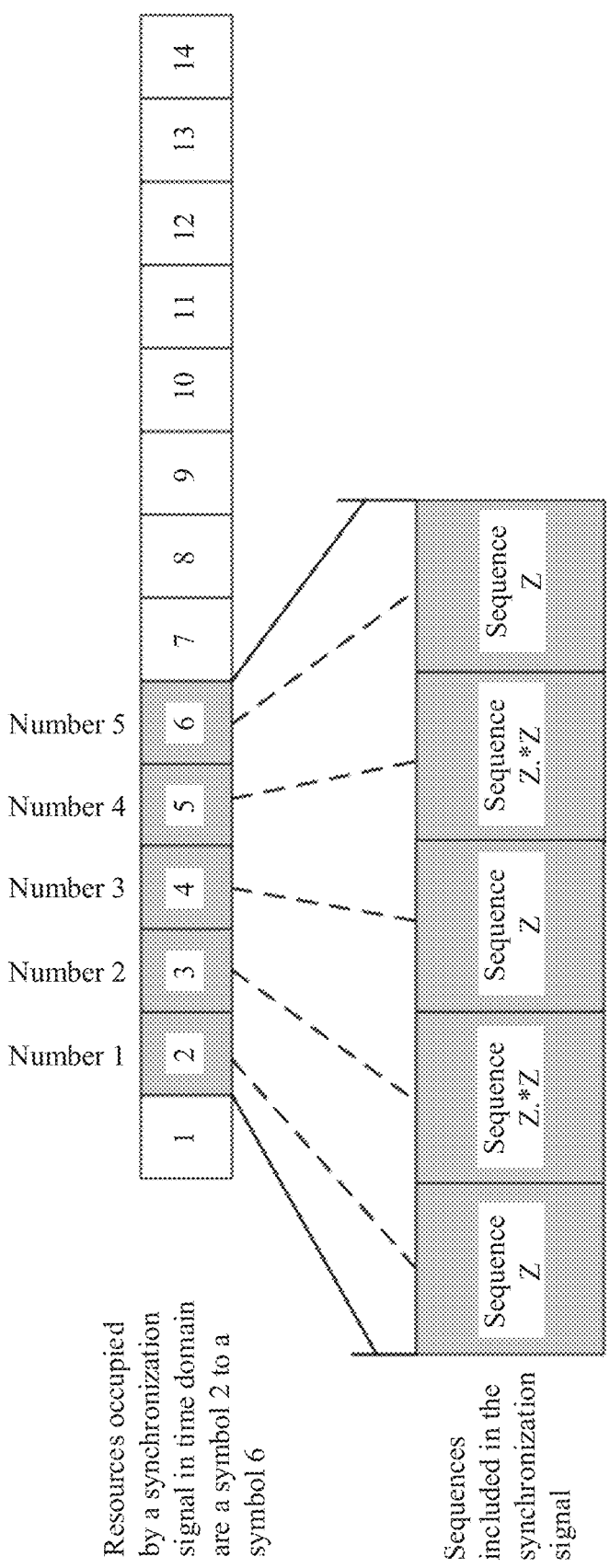
FIG. 4 is an example diagram of a synchronization signal according to an embodiment of this application.

FIG. 4 is an example diagram of a synchronization signal according to an embodiment of this application. In FIG. 4, for example, the N time units are a symbol 2 to a symbol 6. For example, the first sequence is a first complex sequence, and is denoted as a sequence Z. For example, the first calculation rule is a point multiplication rule, and the second sequence is Z.*Z. For a symbol m (in this example, m is an integer greater than or equal to 2 and less than or equal to 6), m may represent an index number of the symbol in one slot. When a number is a ranking of a time unit in the N time units, a number of the symbol 2 is 1, a number of the symbol 3 is 2, a number of the symbol 4 is 3, a number of the symbol 5 is 4, and a number of the symbol 6 is 5. The first time unit group including time units whose numbers are odd numbers includes the symbol 2, the symbol 4, and the symbol 6. The second time unit group including time units whose numbers are even numbers includes the symbol 3 and the symbol 5.

As shown in FIG. 4, the symbol 2, the symbol 4, and the symbol 6 in the first time unit group each carry the first sequence, namely, the sequence Z. As shown in FIG. 4, the symbol 3 and the symbol 5 in the second time unit group each carry the second sequence, namely, the sequence Z.*Z. A pattern sequence of the synchronization signal shown in FIG. 4 may also be referred to as a comb-like sequence.

In another implementation, a number of a time unit may be represented by an absolute number of the time unit in a radio resource. For example, assuming that a time unit is one OFDM symbol, a number of the time unit may be represented by an absolute number of the time unit in one slot or one subframe or one radio frame.

Figure 5:
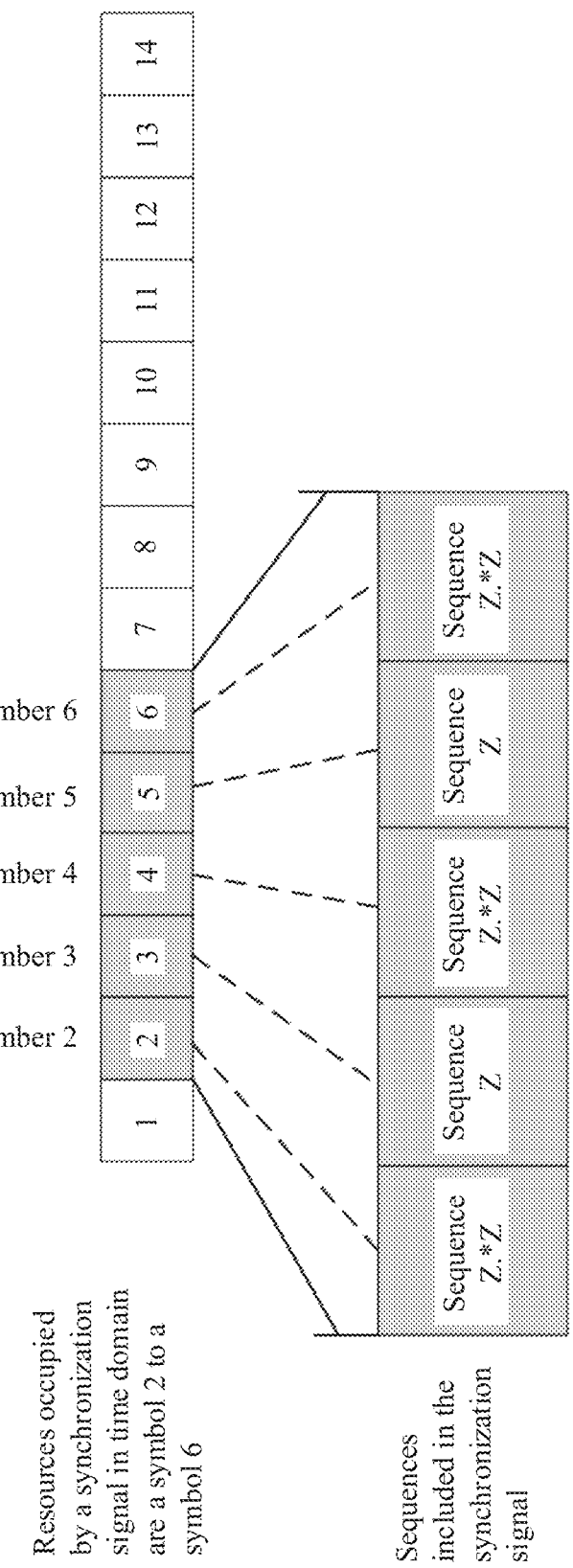
FIG. 5 is another example diagram of a synchronization signal according to an embodiment of this application.

FIG. 5 is another example diagram of a synchronization signal according to an embodiment of this application. On the same assumption as in FIG. 4, a number of the symbol 2 is 2, a number of the symbol 3 is 3, a number of the symbol 4 is 4, a number of the symbol 5 is 5, and a number of the symbol 6 is 6. The first time unit group includes the symbol 3 and the symbol 5. The second time unit group includes the symbol 2, the symbol 4, and the symbol 6. As shown in FIG. 5, the symbol 3 and the symbol 5 in the first time unit group each carry the first sequence, namely, the sequence Z. The symbol 2, the symbol 4, and the symbol 6 in the second time unit group each carry the second sequence, namely, Z.*Z.

In another implementation, the first time unit group includes the first L time units in time domain in the N time units, the second time unit group includes the last (N−L) time units in time domain in the N time units, and L is $\lfloor N/2 \rfloor$ or $\lceil N/2 \rceil$.

Figure 6:
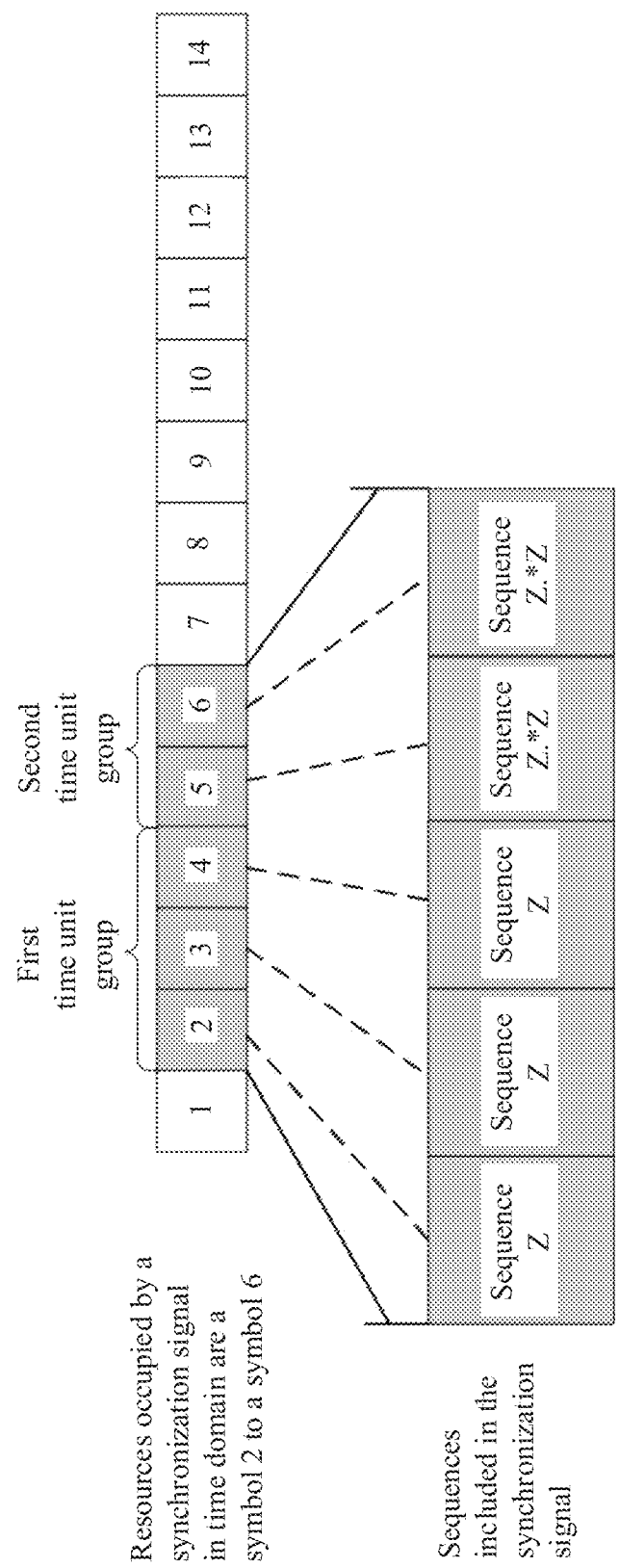
FIG. 6 is still another example diagram of a synchronization signal according to an embodiment of this application.

FIG. 6 is still another example diagram of a synchronization signal according to an embodiment of this application. On the same assumption as in FIG. 4, N is equal to 5, and L is $\lceil 5/2 \rceil$, that is, L is equal to 3. The first time unit group includes the symbol 2, the symbol 3, and the symbol 4, and the second time unit group includes the symbol 5 and the symbol 6. As shown in FIG. 6, the symbol 2, the symbol 3, and the symbol 4 in the first time unit group each carry the first sequence, namely, the sequence Z. The symbol 5 and the symbol 6 in the second time unit group each carry the second sequence, namely, Z.*Z.

In still another implementation, when a number M1 of the first time unit in the N time units is equal to 1, the first sequence is the first complex sequence. Alternatively, when the number M1 of the first time unit in the N time units is greater than 1, the first sequence is a sequence obtained based on the first calculation rule and M1 first complex sequences. Alternatively, when the number M1 of the first time unit in the N time units is equal to 1, the first sequence is the first complex sequence; and when the number M2 of the first time unit in the N time units is greater than 1, the first sequence is the first complex sequence. The second sequence is a sequence obtained based on the first calculation rule and M2 first complex sequences, M2 is a number of the second time unit in the N time units, and M2 is an integer greater than 1. The first time unit is located before the second time unit in time domain. In this implementation, the foregoing two explanations may also be used for a number of a time unit, and details are not described herein again.

Figure 7:
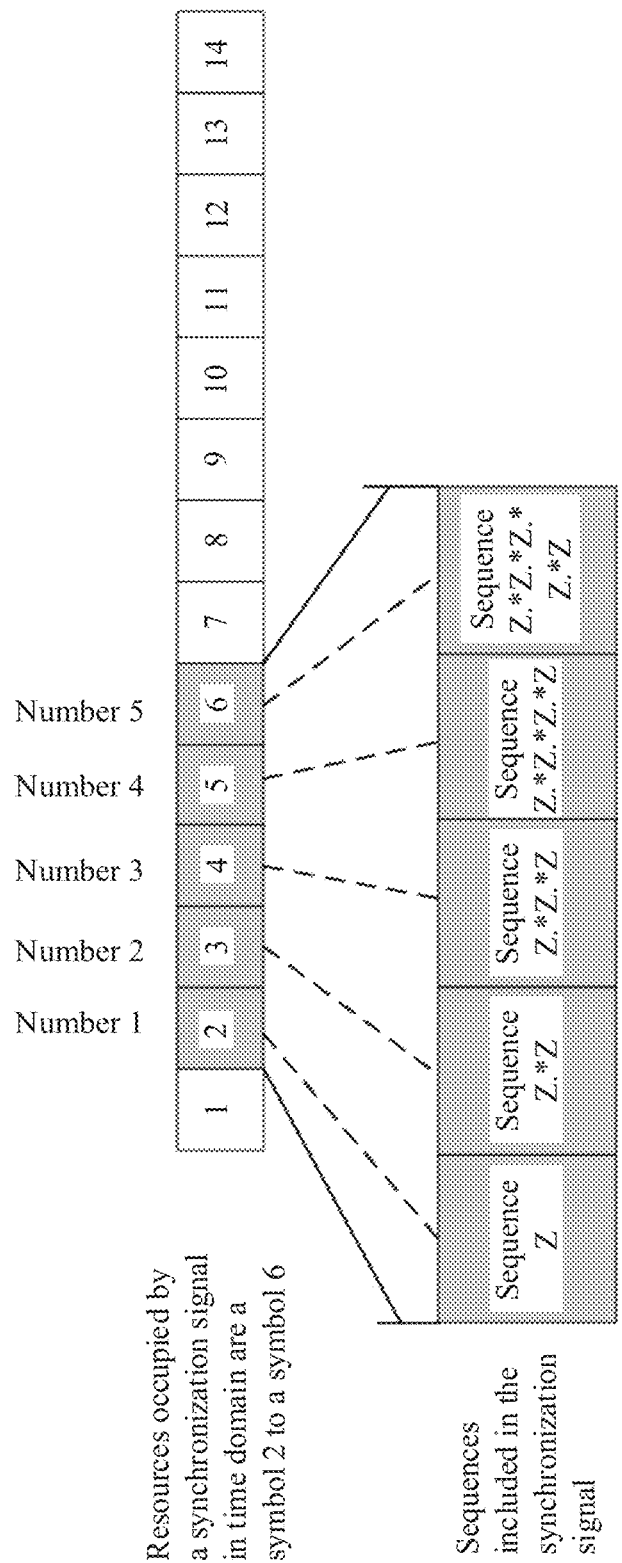
FIG. 7 is still another example diagram of a synchronization signal according to an embodiment of this application.

FIG. 7 is still another example diagram of a synchronization signal according to an embodiment of this application. It is assumed that the first calculation rule is a point multiplication rule. The first complex sequence is denoted as a sequence Z. The N time units are a symbol 2 to a symbol 6 in FIG. 7. A number of a symbol is a ranking of the symbol in the five symbols that are arranged in a time domain sequence. A number of the symbol 2 is 1, a number of the symbol 3 is 2, a number of the symbol 4 is 3, a number of the symbol 5 is 4, and a number of the symbol 6 is 5.

In this case, because the number of the symbol 2 is 1, a sequence carried on the symbol 2 is the first complex sequence, namely, the sequence Z. Sequences carried on the symbol 3 to the symbol 6 may be determined based on the numbers of the symbols and the first calculation rule. As shown in FIG. 7, because the number of the symbol 3 is 2, a sequence carried on the symbol 3 is point multiplication of two sequences Z, namely, a sequence Z.*Z. Because the number of the symbol 4 is 3, a sequence carried on the symbol 4 is point multiplication of three sequences Z, namely, a sequence Z.*Z.*Z. Because the number of the symbol 5 is 4, a sequence carried on the symbol 5 is point multiplication of four sequences Z, namely, a sequence Z.*Z.*Z.*Z. Because the number of the symbol 6 is 5, a sequence carried on the symbol 6 is point multiplication of five sequences Z, namely, a sequence Z.*Z.*Z.*Z.*Z.

Figure 8:
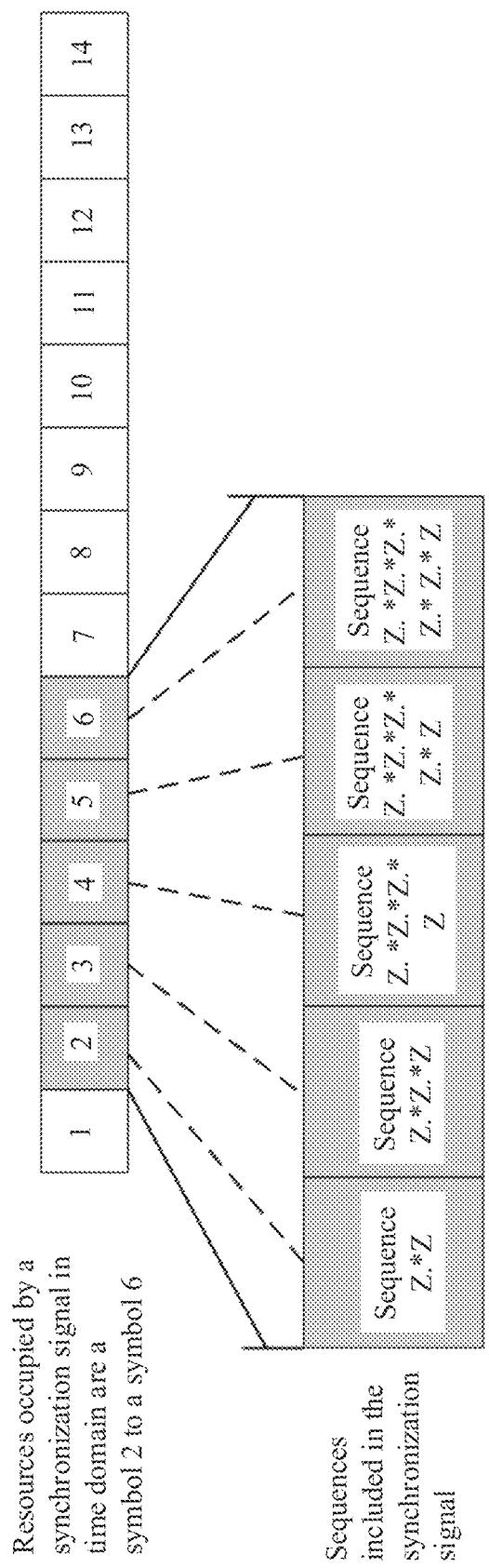
FIG. 8 is still another example diagram of a synchronization signal according to an embodiment of this application.

FIG. 8 is still another example diagram of a synchronization signal according to an embodiment of this application. An assumption in FIG. 8 differs from the assumption in FIG. 7 in that in FIG. 8, a number of a symbol is an index number of the symbol in a radio resource. Therefore, a number of the symbol 2 is 2, a number of the symbol 3 is 3, a number of the symbol 4 is 4, a number of the symbol 5 is 5, and a number of the symbol 6 is 6.

In this case, because the number of the symbol 2 is greater than 2, a sequence carried on the symbol 2 is also obtained based on the first calculation rule and two first complex sequences, namely, a sequence Z.*Z. Sequences carried on the symbol 3 to the symbol 6 may also be determined based on the numbers of the symbols and the first calculation rule. As shown in FIG. 8, because the number of the symbol 3 is 3, a sequence carried on the symbol 3 is point multiplication of three sequences Z, namely, a sequence Z.*Z.*Z. Because the number of the symbol 4 is 4, a sequence carried on the symbol 4 is point multiplication of four sequences Z, namely, a sequence Z.*Z.*Z.*Z. Because the number of the symbol 5 is 5, a sequence carried on the symbol 5 is point multiplication of five sequences Z, namely, a sequence Z.*Z.*Z.*Z.*Z. Because the number of the symbol 6 is 6, a sequence carried on the symbol 6 is point multiplication of six sequences Z, namely, a sequence Z.*Z.*Z.*Z.*Z.*Z.

In still another implementation, the first sequence is the first complex sequence, or the first sequence is a sequence obtained based on the first complex sequence and the first calculation rule. The second sequence is obtained by applying the first calculation rule to the first sequence and the first complex sequence. The second time unit is an adjacent time unit following the first time unit. In other words, a sequence carried on each of the N time units is obtained by applying the first calculation rule to a sequence carried on a time unit adjacent to the time unit and the first complex sequence.

Figure 9:
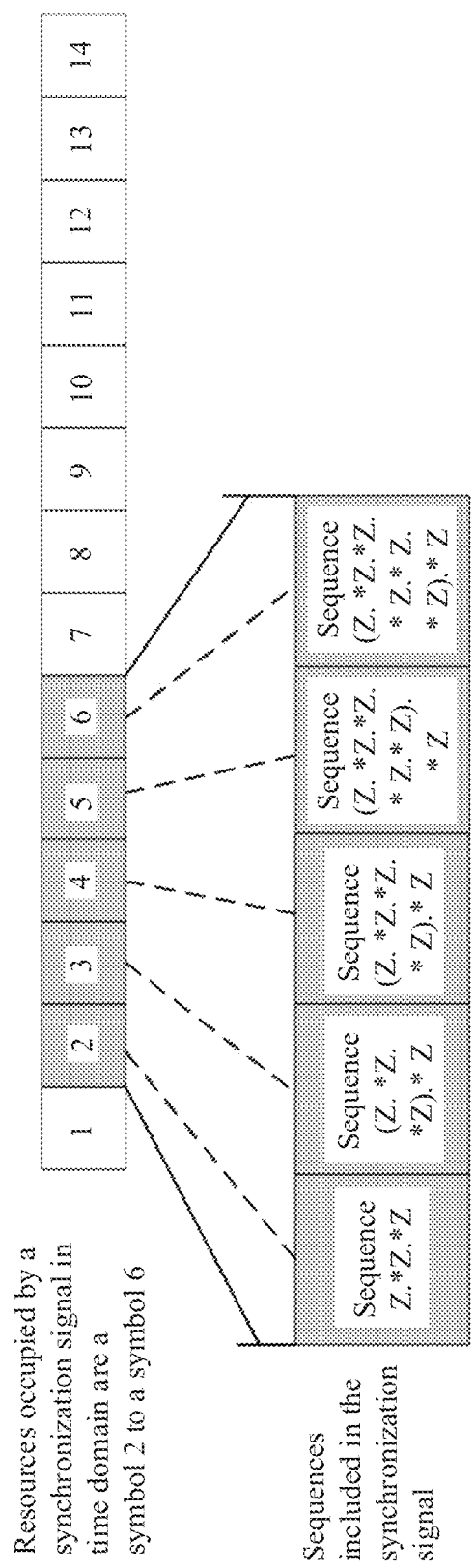
FIG. 9 is still another example diagram of a synchronization signal according to an embodiment of this application.

FIG. 9 is still another example diagram of a synchronization signal according to an embodiment of this application. As shown in FIG. 9, it is assumed that the first calculation rule is a point multiplication rule. The first complex sequence is denoted as a sequence Z. The first sequence is a sequence Z.*Z.*Z. The N time units are a symbol 2 to a symbol 6 in FIG. 9. A first sequence carried on the symbol 2 is a sequence Z.*Z.*Z. In this case, a sequence carried on the symbol 3 is point multiplication between Z.*Z.*Z carried on the symbol 2 and Z, namely, a sequence (Z.*Z.*Z).*Z. A sequence carried on the symbol 4 is point multiplication between Z.*Z.*Z.*Z carried on the symbol 3 and Z, namely, a sequence (Z.*Z.*Z.*Z).*Z. A sequence carried on the symbol 5 is point multiplication between Z.*Z.*Z.*Z.*Z carried on the symbol 4 and Z, namely, a sequence (Z.*Z.*Z.*Z.*Z).*Z. A sequence carried on the symbol 6 is point multiplication between Z.*Z.*Z.*Z.*Z.*Z carried on the symbol 5 and Z, namely, a sequence (Z.*Z.*Z.*Z.*Z.*Z).*Z.

In the foregoing implementations, FIG. 4 to FIG. 9 are all described by using an example in which the first calculation rule is a point multiplication rule. Optionally, the point multiplication rule in FIG. 4 to FIG. 9 may also be replaced with either of the foregoing conjugate point multiplication rule and the foregoing conjugate point division rule.

In another implementation, resources occupied by a synchronization signal in time domain are (N+K) time units. Any one of the foregoing implementations in FIG. 4 to FIG. 9 may be used for N time units. In other words, in the embodiments disclosed in this application, when sequences carried on some time units in the resources occupied by the synchronization signal in time domain are the pattern sequences shown in FIG. 4 to FIG. 9, a correlation processing result obtained by the terminal based on the sequences carried on the some time units can still be a complex sequence. Further, a sharp correlation peak can be obtained. Sequences carried on the other K time units are not limited in the embodiments of this application.

Figure 10:
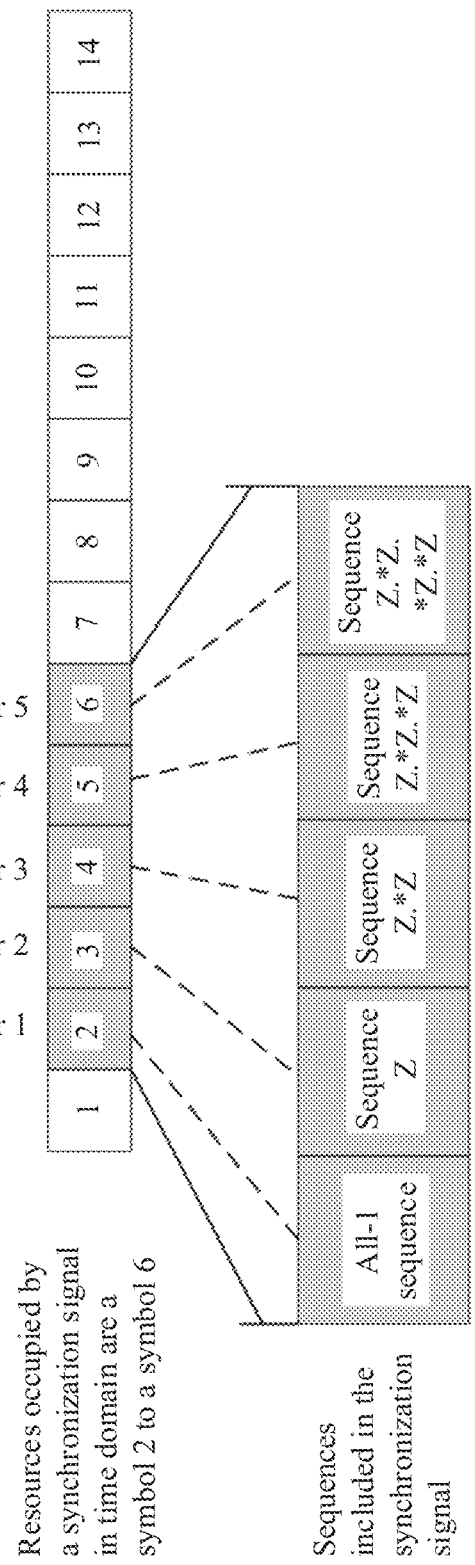
FIG. 10 is still another example diagram of a synchronization signal according to an embodiment of this application.

FIG. 10 is still another example diagram of a synchronization signal according to an embodiment of this application. As shown in FIG. 10, it is assumed that the first calculation rule is a point multiplication rule. The first complex sequence is denoted as a sequence Z. Resources occupied by the synchronization signal in time domain are a symbol 2 to a symbol 6 shown in FIG. 10. The implementation shown in FIG. 9 is used for sequences carried on the symbol 3 to the symbol 6. To be specific, the symbol 3 carries a sequence Z. A sequence carried on the symbol 4 is point multiplication between the sequence carried on the symbol 3 and Z, namely, a sequence Z.*Z. A sequence carried on the symbol 5 is point multiplication between the sequence carried on the symbol 4 and Z, namely, a sequence Z.*Z.*Z. A sequence carried on the symbol 6 is point multiplication between the sequence carried on the symbol 5 and Z, namely, a sequence Z.*Z.*Z.*Z.

In this implementation, for the N time units, a number of a time unit may still use the foregoing number related definition, to determine a sequence carried on each time unit. Optionally, a number of each of the N time units may be determined within a range of the (N+K) time units. This is not limited in the embodiments disclosed in this application.

In still another implementation, the synchronization signal includes a first sequence and a second sequence, but the first sequence may be a constant sequence. The second sequence is a first complex sequence or a sequence obtained based on the first complex sequence. In this implementation, a correlation processing result between the first sequence and the second sequence is still a complex sequence, and therefore a sharp correlation peak can also be obtained.

Figure 11:
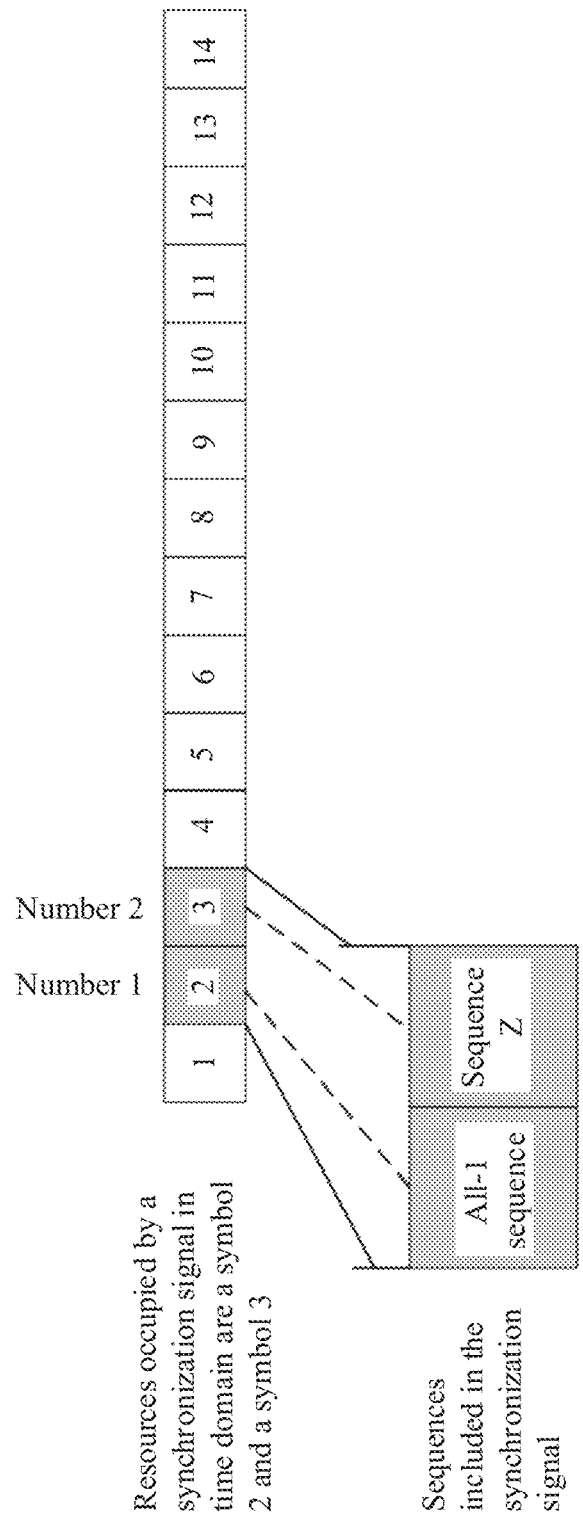
FIG. 11 is still another example diagram of a synchronization signal according to an embodiment of this application.

FIG. 11 is still another example diagram of a synchronization signal according to an embodiment of this application. As shown in FIG. 11, it is assumed that the first sequence is an all-1 sequence, and the second sequence is a first complex sequence, and is denoted as a sequence Z. Resources occupied by the synchronization signal in time domain are a symbol 2 and a symbol 3. The symbol 2 carries the first sequence, namely, the all-1 sequence. The symbol 3 carries the second sequence, namely, the sequence Z. It can be learned that a correlation processing result between the first sequence and the second sequence is a sequence Z (where it is assumed that the first correlation operation used for the correlation processing result is a point multiplication rule). In this implementation, the synchronization signal occupies a relatively small quantity of symbols. Therefore, this implementation is applicable to a scenario which a channel condition is relatively good, and can implement quick synchronization with the network device.

In another implementation, the N time units are classified into at least two time unit groups. As described above, the at least two time unit groups may also be obtained through classification in a manner predefined in a protocol or in an RRC configuration manner. The at least two time unit groups include a first time unit group and a second time unit group.

However, different from the foregoing implementation in which the first time unit is any time unit in the first time unit group and the second time unit is any time unit in the second time unit group, in this implementation, the first time unit group may be divided into a third time unit group and a fourth time unit group by using the foregoing various implementations. A first time unit is any time unit in the third time unit group, and a second time unit is any time unit in the fourth time unit group. Therefore, a sequence carried on each time unit in the first time unit group may have the sequence pattern described in any one of FIG. 4 to FIG. 13. The second time unit group may also be divided into a fifth time unit group and a sixth time unit group by using the foregoing various implementations. A first time unit is any time unit in the fifth time unit group, and a second time unit is any time unit in the sixth time unit group. Therefore, a sequence carried on each time unit in the second time unit group may also have the sequence pattern described in any one of FIG. 4 to FIG. 13.

In other words, the N time units may be classified into at least two time unit groups, and for each time unit group, any one of the foregoing implementations may be used to determine a sequence carried on each time unit in the time unit group. Optionally, implementations used by the time unit groups may be the same or may be different.

Figure 12:
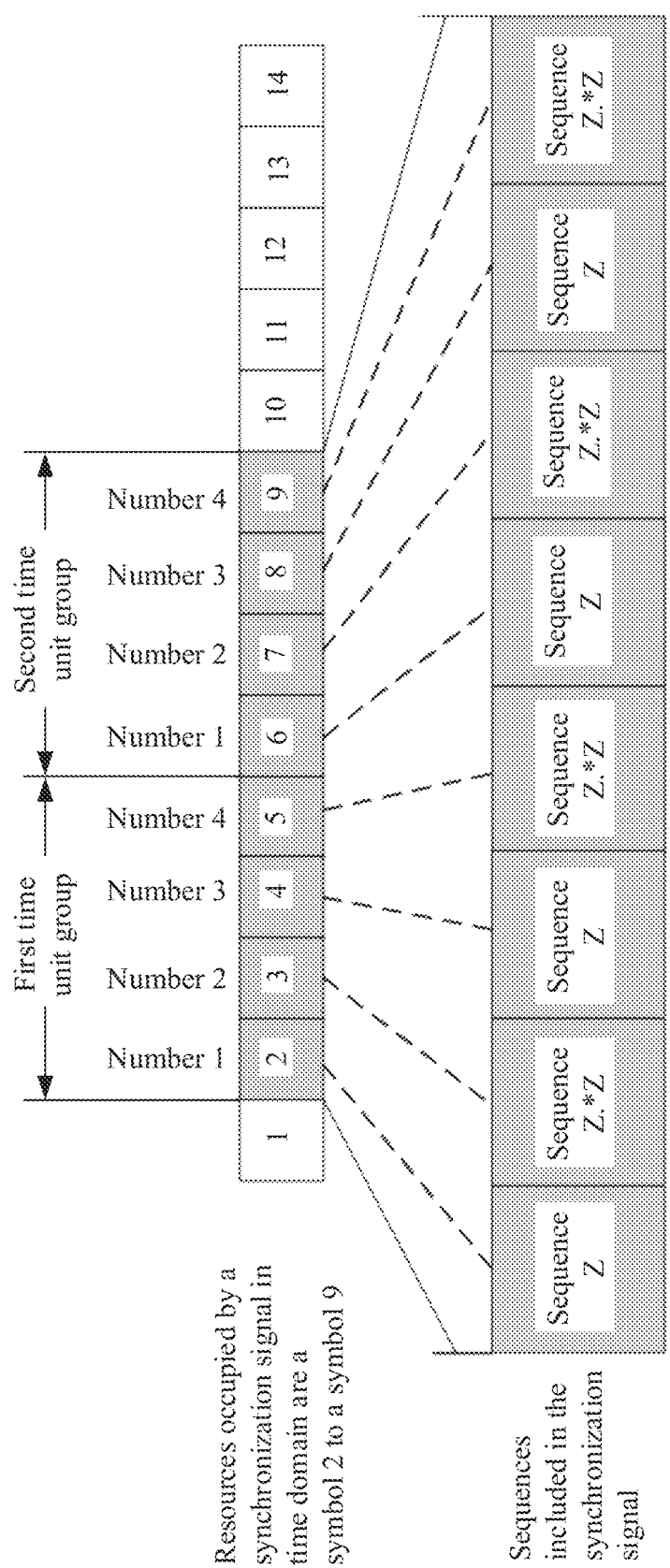
FIG. 12 is still another example diagram of a synchronization signal according to an embodiment of this application.
Figure 13:
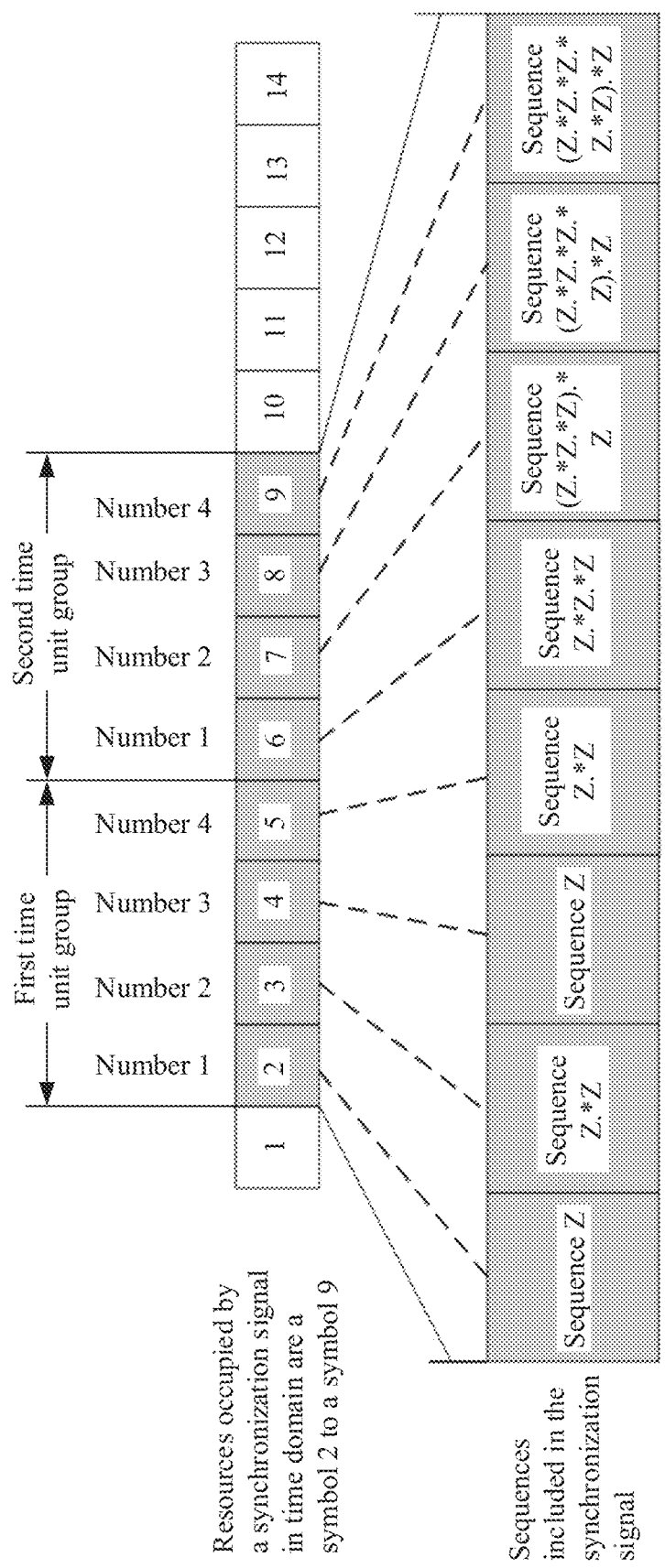
FIG. 13 is still another example diagram of a synchronization signal according to an embodiment of this application.

In FIG. 12, for example, the implementations used by the time unit groups are the same, and each time unit group uses the implementation shown in FIG. 4. In FIG. 13, for example, the implementations used by the time unit groups are different, the first time unit group uses the implementation shown in FIG. 4, and the second time unit group uses the implementation shown in FIG. 9.

FIG. 12 is still another example diagram of a synchronization signal according to an embodiment of this application. It is assumed that the N time units are a symbol 2 to a symbol 9 in FIG. 13. The N time units are classified into two time unit groups, the first time group is the symbol 2 to the symbol 5, and the second time unit group is the symbol 6 to the symbol 9.

The first time unit group uses the implementation shown in FIG. 4. A number of the symbol 2 is 1, a number of the symbol 3 is 2, a number of the symbol 4 is 3, and a number of the symbol 5 is 4. Therefore, as shown in FIG. 12, sequences carried on the symbol 2 and the symbol 4 are sequences Z, and sequences carried on the symbol 3 and the symbol 5 are sequences Z.*Z.

The second time unit group uses the implementation shown in FIG. 4. A number of the symbol 6 is 1, a number of the symbol 7 is 2, a number of the symbol 8 is 3, and a number of the symbol 9 is 4. Therefore, as shown in FIG. 12, sequences carried on the symbol 6 and the symbol 8 are sequences Z, and sequences carried on the symbol 7 and the symbol 9 are sequences Z.*Z.

FIG. 13 is still another example diagram of a synchronization signal according to an embodiment of this application. It is assumed that the N time units are a symbol 2 to a symbol 9 in FIG. 13. The N time units are classified into two time unit groups, the first time unit group is the symbol 2 to the symbol 5, and the second time unit group is the symbol 6 to the symbol 9.

The first time unit group uses the implementation shown in FIG. 4. A number of the symbol 2 is 1, a number of the symbol 3 is 2, a number of the symbol 4 is 3, and a number of the symbol 5 is 4. Therefore, as shown in FIG. 11, sequences carried on the symbol 2 and the symbol 4 are sequences Z, and sequences carried on the symbol 3 and the symbol 5 are sequences Z.*Z.

The second time unit group uses the implementation shown in FIG. 9. The symbol 6 is a start symbol of the group, and carries a sequence Z.*Z.*Z. Sequences carried on adjacent symbols are sequentially determined starting from the symbol 6. As shown in FIG. 13, a sequence carried on the symbol 7 is point multiplication between Z.*Z.*Z carried on the symbol 6 and Z, namely, a sequence (Z.*Z.*Z).*Z. A sequence carried on the symbol 8 is point multiplication between Z.*Z.*Z.*Z carried on the symbol 7 and Z, namely, a sequence (Z.*Z.*Z.*Z).*Z. A sequence carried on the symbol 9 is point multiplication between Z.*Z.*Z.*Z.*Z carried on the symbol 8 and Z, namely, a sequence (Z.*Z.*Z.*Z.*Z).*Z.

Optionally, in the foregoing implementations shown in FIG. 12 and FIG. 13, the N time units may be classified into a plurality of groups, for example, P groups, where P is an integer greater than 1. The second group to the $(P-1)^{th}$ group each include $\lfloor N/P \rfloor$ time units or $\lceil N/P \rceil$ time units. The first group includes $N-(P-1)*\lfloor N/P \rfloor$ time units or $N-(P-1)*\lceil N/P \rceil$ time units. A sequence carried on each time unit in each group may use the implementation shown in any one of FIG. 4 to FIG. 13.

It can be learned that the foregoing implementations related to FIG. 12 and FIG. 13 are conducive to reusing a synchronization signal structure of a new radio system and therefore simplify system design complexity. For example, a synchronization signal in the new radio system includes four sequences, and occupies four symbols in time domain. To implement enhanced coverage of a low-power wide area network, a synchronization signal needs to be repeatedly transmitted to ensure receiving performance on a side of the terminal device. In the low-power wide area network, the network device may use four symbols as one group and repeatedly transmit a plurality of groups. The groups use a same synchronization signal structure, as shown in FIG. 12. Alternatively, the groups use different synchronization signal structures, as shown in FIG. 13. Therefore, time domain structures of synchronization signals in repeated transmission can be greatly reduced, so that system design complexity is reduced. It should be noted that, for the plurality of groups repeatedly transmitted herein, the network device may send the groups of synchronization signals by using a same transmit beam or by using different transmit beams. This is not limited in this embodiment of this application.

In another implementation, one group of time units in FIG. 12 and FIG. 13 may correspond to one synchronization signal. In other words, in FIG. 12 and FIG. 13, the network device can send two synchronization signals. The first synchronization signal occupies a symbol 2 to a symbol 5 in time domain, and the second synchronization signal occupies a symbol 6 to a symbol 9 in time domain. Optionally, resources separately occupied, in time domain, by the two synchronization signals sent by the network device may be consecutive or non-consecutive.

Figure 14:
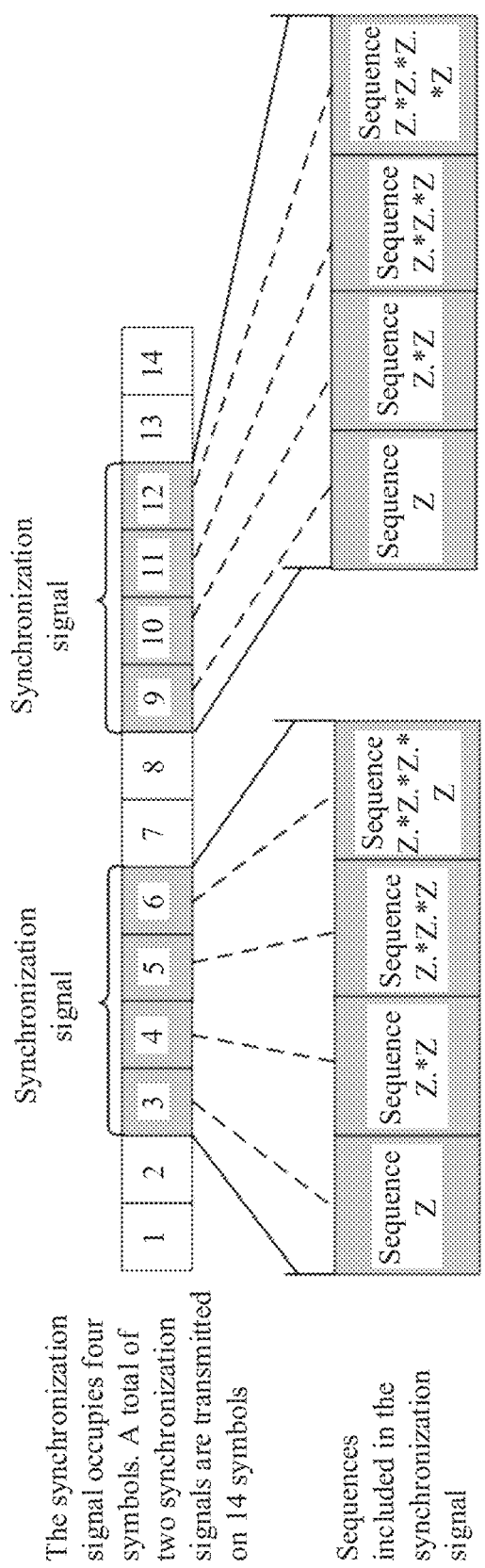
FIG. 14 is an example diagram of a plurality of synchronization signals according to an embodiment of this application.

For example, FIG. 14 is an example diagram of a synchronization signal according to this application. In FIG. 14, resources occupied by the first synchronization signal in time domain are a symbol 3 to a symbol 6. In addition, for the symbol 3 to the symbol 6, a sequence carried on each symbol is determined by using the implementation shown in FIG. 7. Resources occupied by the second synchronization signal in time domain are a symbol 9 to a symbol 12. In addition, for the symbol 9 to the symbol 12, a sequence carried on each symbol may also be determined by using the implementation shown in FIG. 7.

Figure 15:
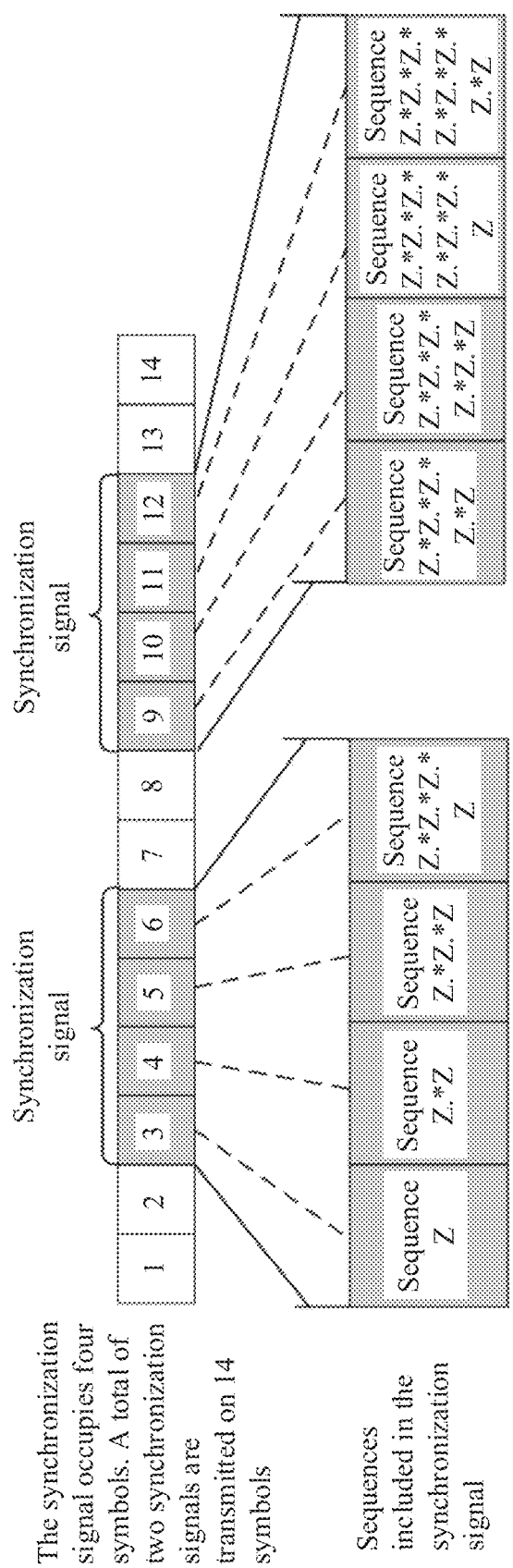
FIG. 15 is another example diagram of a plurality of synchronization signals according to an embodiment of this application.

For another example, FIG. 15 is an example diagram of a synchronization signal according to this application. Time domain resources used by the first synchronization signal and the second synchronization signal in FIG. 15 are the same as those in FIG. 14. However, in FIG. 15, sequence patterns of the first synchronization signal and the second synchronization signal are different. To be specific, for the first synchronization signal, a sequence carried on each symbol is determined by using the implementation shown in FIG. 7. For the second synchronization signal, a sequence carried on each symbol may be determined by using the implementation shown in FIG. 8.

In other words, in the embodiments of this application, the network device may send a plurality of synchronization signals. Time domain resources occupied by the plurality of synchronization signals may be consecutive or non-consecutive. For each synchronization signal, a sequence carried on each time unit may be determined by using the implementation described in any one of FIG. 4 to FIG. 13.

In the foregoing various implementations related to FIG. 4 to FIG. 13, the correlation processing result between the first sequence and the second sequence is a complex sequence. The complex sequence may represent an index number and/or an identity of a cell by a using a quantity of bits shifted from a local sequence or by using different correlation processing results between the complex sequence and the local sequence. The index number and/or the identity of the cell may be understood as identity information of the cell, for example, represented by a cell ID.

If a correlation processing result between a first sequence and a second sequence in one synchronization signal is different from a correlation processing result between a first sequence and a second sequence in another synchronization signal, the two different correlation processing results may be used to carry different cell IDs. Correspondingly, for different correlation processing results, the terminal may perform the foregoing second correlation operation on different local sequences and the different correlation processing results to obtain maximum values separately corresponding to the different correlation processing results.

For example, for the first synchronization signal, a correlation processing result between a first sequence and a second sequence in the first synchronization signal is used as a first correlation processing result, and the terminal may perform the second correlation processing on a local sequence 1 and the first correlation processing result to obtain a maximum value. For the second synchronization signal, a correlation processing result between a first sequence and a second sequence in the second synchronization signal is used as a second correlation processing result, and the terminal may perform the second correlation processing on a local sequence 2 and the second correlation processing result to obtain another maximum value. Therefore, the terminal may determine, by using the larger one in the two maximum values, whether a synchronization signal sent by the network device is the first sequence and the second sequence that correspond to the first correlation processing result or the first sequence and the second sequence that correspond to the second correlation processing result. It can be learned that the various synchronization signal structures shown in FIG. 4 to FIG. 15 are equivalent to 1-bit information carried in a synchronization signal sent by the network device.

Because a complex sequence can provide more sequences with a good correlation property, more information may be further carried by using the sequence in the embodiments disclosed in this application. For example, if the embodiments disclosed in this application are used in a new radio system, the new radio system may support 1008 cell IDs. The network device may use a first sequence to carry some cell IDs or carry some information for determining a cell ID.

For example, in the new radio system, a primary synchronization signal uses a synchronization signal structure disclosed in this application. As described above, the primary synchronization signal may carry 1-bit information, and a value of the bit information is 1 or 0. A secondary synchronization signal is designed by reusing a narrowband secondary synchronization signal (NSSS), and carries 504 cell IDs. In this way, when the bit information is 0, it indicates that the secondary synchronization signal can carry the first to the $504^{th}$ cell IDs, and when the bit information is 1, it indicates that the secondary synchronization signal can carry the $505^{th}$ to the $1008^{th}$ cell IDs; or when the bit information is 0, it indicates that the secondary synchronization signal can carry the $505^{th}$ to the $1008^{th}$ cell IDs, and when the bit information is 1, it indicates that the secondary synchronization signal can carry the first to the $504^{th}$ cell IDs. Therefore, 1008 cell IDs (where the 1008 cell IDs may range from 0 to 1007) can be jointly determined by using the primary synchronization signal and the secondary synchronization signal. The 1008 cell IDs may be other information such as other information necessary for accessing the network device. This is not limited in the embodiments of this application.

The following describes the synchronization signal transmission method of this application with reference to the foregoing various implementations.

Figure 16:
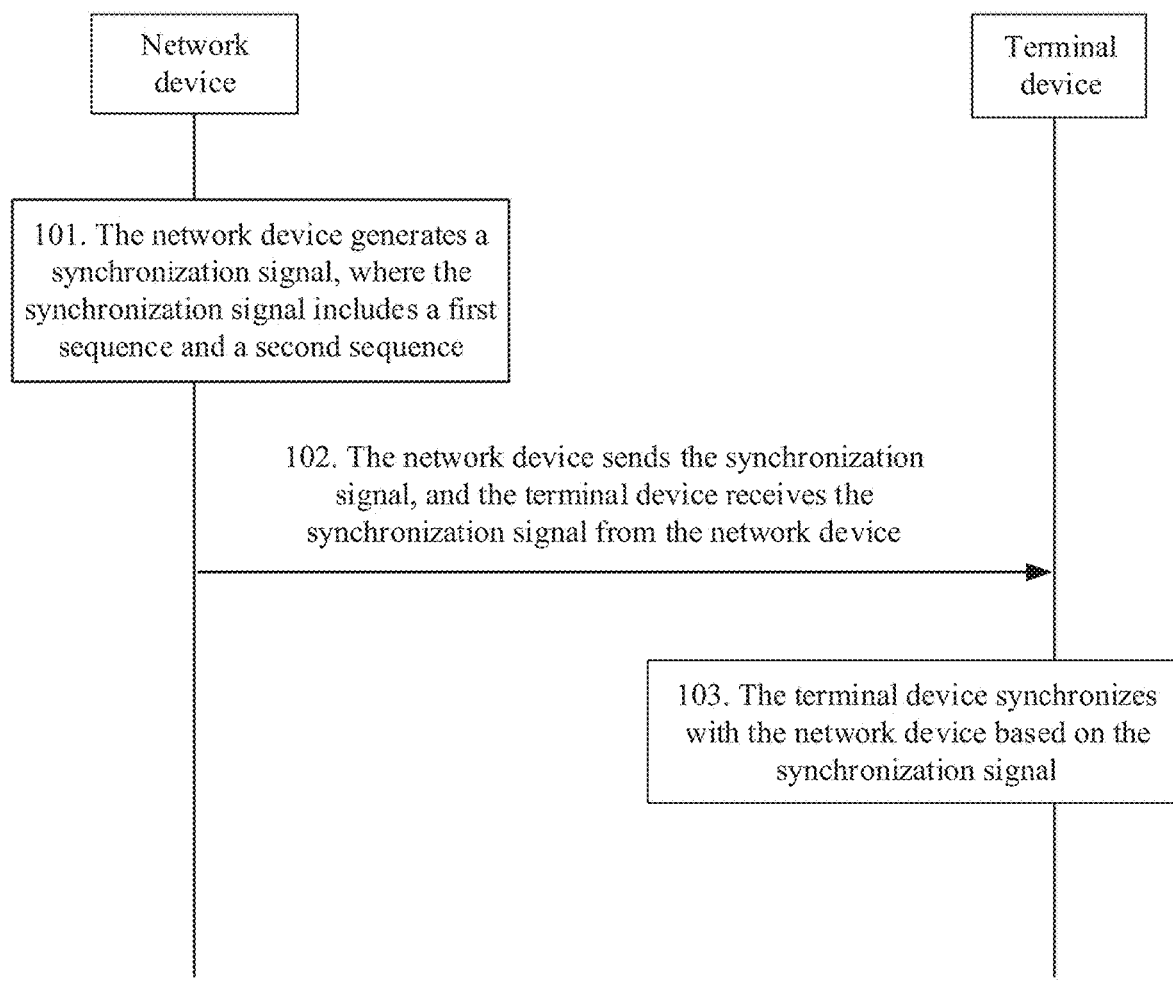
FIG. 16 is a schematic flowchart of a synchronization signal transmission method according to an embodiment of this application.

FIG. 16 is a schematic flowchart of a synchronization signal transmission method according to an embodiment of this application. As shown in FIG. 16, the synchronization signal transmission method may include the following steps.

101. A network device generates a synchronization signal, where the synchronization signal includes a first sequence and a second sequence.

102. The network device sends the synchronization signal, and a terminal receives the synchronization signal from the network device.

That the network device sends the synchronization signal may include: The network device sends the first sequence on a first time unit, and sends the second sequence on a second time unit. The terminal device receives the first sequence sent by the network device on the first time unit and the second sequence sent by the network device on the second time unit. If resources occupied by the synchronization signal in time domain include a plurality of time units, the network device may send, on each time unit, a sequence carried on the time unit.

103. The terminal device synchronizes with the network device based on the synchronization signal.

For example, the terminal device synchronizes with the network device based on the first sequence and the second sequence.

The first sequence is a first complex sequence or a sequence obtained based on the first complex sequence, and the second sequence is a sequence obtained based on the first complex sequence. The first sequence is different from the second sequence, and a correlation processing result between the first sequence and the second sequence is a complex sequence.

In this embodiment of this application, that a network device generates a synchronization signal may include: The network device determines, by using the implementation described in any one of FIG. 4 to FIG. 13, the first sequence carried on the first time unit and the second sequence carried on the second time unit.

Figure 17:
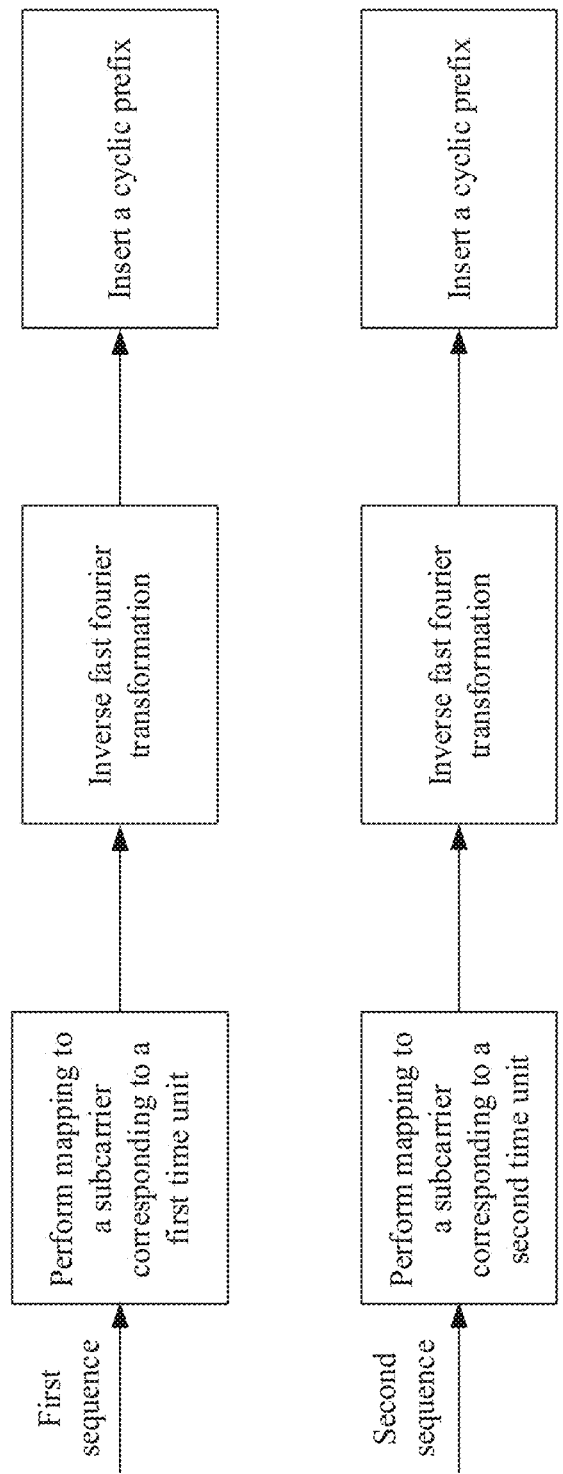
FIG. 17 is a schematic diagram 1 of a part of processing procedure of a synchronization signal according to an embodiment of this application.

In an implementation, a process in which the network device sends the synchronization signal is described by using an example in which sequences are sent on two time units. That the network device sends the synchronization signal may include: As shown in FIG. 17, the network device maps each element in the first sequence to each subcarrier corresponding to the first time unit, and maps each element in the second sequence to each subcarrier corresponding to the second time unit; and performs inverse fast Fourier transformation (IFFT) on each subcarrier that is in each time unit and to which mapping is performed, and insert a cyclic prefix (CP) to resist multipath channel interference, to send time domain signals on the time units. A quantity of elements in the first sequence may be the same as or different from a quantity of subcarriers corresponding to the first time unit. Correspondingly, a quantity of elements in the second sequence may also be the same as or different from a quantity of subcarriers corresponding to the second time unit.

In this embodiment of this application, subcarriers corresponding to time units are resources occupied by the synchronization signal in frequency domain.

Figure 18:
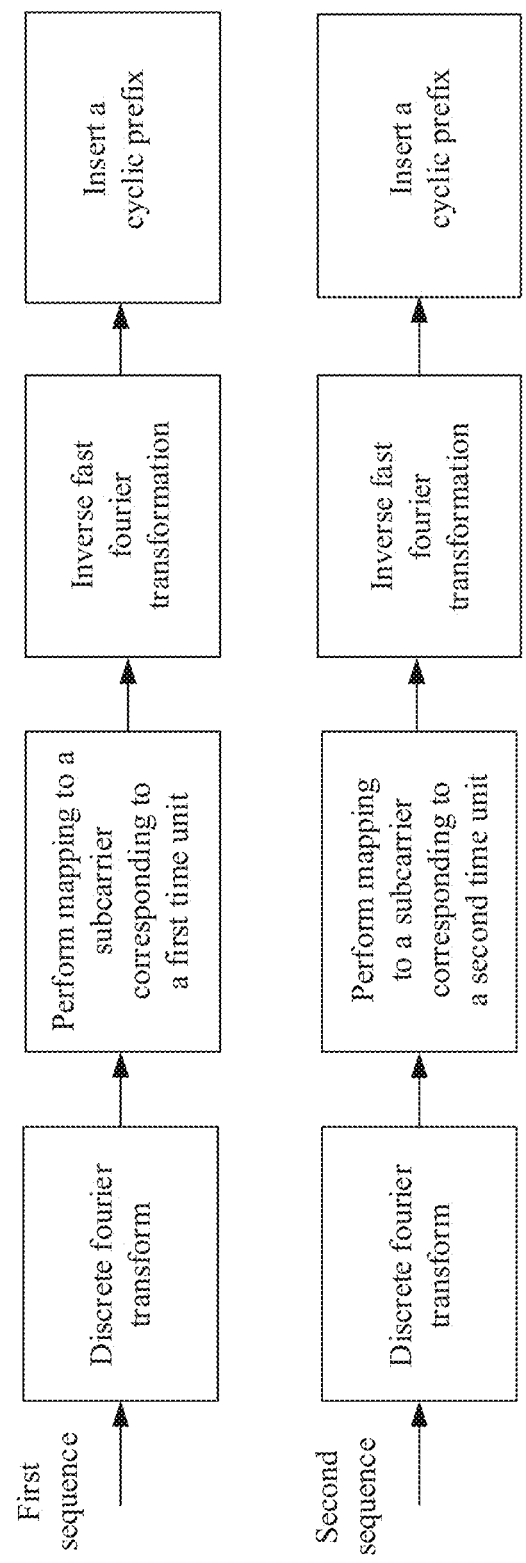
FIG. 18 is a schematic diagram 2 of a part of processing procedure of a synchronization signal according to an embodiment of this application.

In another implementation, a process in which the network device sends the synchronization signal is described by using an example in which sequences are sent on two time units. That the network device sends the synchronization signal may include: As shown in FIG. 18, the network device first performs L-point discrete Fourier transform (DFT) on the first sequence, where L may be a quantity of subcarriers corresponding to the first time unit carrying the first sequence, or may be obtained based on the quantity of subcarriers corresponding to the first time unit. Similarly, the network device also performs L-point discrete Fourier transform (DFT) on the second sequence, where L is a quantity of subcarriers corresponding to the second time unit carrying the second sequence or is obtained based on the quantity of subcarriers corresponding to the second time unit. Then the network device maps a first sequence obtained after the DFT to each subcarrier corresponding to the first time unit, and maps a second sequence obtained after the DFT to each subcarrier corresponding to the second time unit. Then the network device separately performs inverse fast Fourier transformation (IFFT) on time domain signals obtained after mapping, and inserts a cyclic prefix (CP) to resist multipath channel interference, to separately send time domain signals on the time units.

The quantity of subcarriers corresponding to the first time unit is a quantity of subcarriers used by the first time unit to transmit the first sequence. Similarly, the quantity of subcarriers corresponding to the second time unit is a quantity of subcarriers used by the second time unit to transmit the second sequence.

Optionally, in the foregoing two implementations of FIG. 17 and FIG. 18, power of an element on each subcarrier may be further adjusted, to ensure performance of receiving each time domain signal on a side of the terminal device. Other processing may be further performed in the foregoing two implementations of FIG. 17 and FIG. 18, and this is not limited in this embodiment of this application. In addition, FIG. 17 may be applied to a case in which the first complex sequence is a sequence obtained by performing inverse fast Fourier transformation (IFFT) or fast Fourier transformation (FFT) on a ZC sequence, an m sequence, or a gold sequence. FIG. 18 may be applied to a case in which the first complex sequence is a ZC sequence. In addition, the inverse fast Fourier transformation (IFFT) in FIG. 17 and FIG. 18 may be replaced with inverse discrete Fourier transform (IDFT). The fast Fourier transformation in FIG. 18 may be replaced with discrete Fourier transform (DFT).

In an implementation, that the terminal device synchronizes with the network device based on the first sequence and the second sequence includes: The terminal device performs the first correlation operation on the first sequence and the second sequence to obtain a correlation processing result. The terminal device performs the second correlation operation on the correlation processing result and a current sequence to obtain a correlation peak. The terminal device synchronizes with the network device based on a time domain location in which the correlation peak is located. In this embodiment of this application, the correlation processing result between the first sequence and the second sequence is still a complex sequence, and has a better autocorrelation property than a common correlation processing result that is a sequence including +1 and −1. Therefore, the terminal can obtain a sharp correlation peak when performing a correlation operation on the correlation processing result and the local sequence, as shown in FIG. 2a, FIG. 2b, FIG. 3a, and FIG. 3b.

The sharp correlation peak can shorten time required by the terminal to synchronize with the network device to implement time domain synchronization, and can also assist in frequency offset estimation to obtain a smaller frequency offset error. The reason is as follows: If the terminal can receive, at a more accurate time, the synchronization signal sent by the network device, accumulated energy of wanted signals is higher when frequency offset estimation is performed, so that a frequency offset estimation error is reduced during frequency offset estimation. Further, the terminal is synchronized with the network device more quickly, and time required by the terminal to implement synchronization can be further shortened, so that power consumption of the terminal is reduced.

An embodiment of this application further provides a synchronization signal transmission method. FIG. 16 describes the synchronization signal transmission method by using two time units as an example. In this embodiment, an example in which a synchronization signal includes N time units is described. Correspondingly, in the synchronization signal transmission method, the synchronization signal includes N sequences. The synchronization signal transmission method may include: A network device generates a synchronization signal. The synchronization signal includes N sequences. The N sequences included in the synchronization signal may have the sequence pattern in any one of the implementations shown in FIG. 4 to FIG. 13. Details are not described herein again. The network device sends the synchronization signal. A terminal device receives the synchronization signal from the network device. The network device may send the synchronization signal for N time units by using the processing process shown in FIG. 17 or FIG. 18. Details are not described herein again. The terminal device synchronizes with the network device based on the synchronization signal. When synchronizing with the network device based on the synchronization signal, the terminal device may perform correlation processing based on the sequence pattern in any one of the implementations shown in FIG. 4 to FIG. 13, to synchronize with the network device. Refer to the related content shown in FIG. 16.

N is an integer greater than or equal to 2. The N sequences include the first sequence and the second sequence in FIG. 16. The N time units include the first time unit and the second time unit in FIG. 16.

In this embodiment of this application, the terminal device may adaptively select, based on a channel status between the terminal device and the network device, a quantity of time units used for synchronization estimation. For example, if a channel condition between the terminal device and the network device is relatively good, the terminal device may synchronize with the network device by performing an operation on any two or three of the N time units. If the channel condition is relatively poor, the terminal device may synchronize with the network device by performing an operation on N symbols. Therefore, the synchronization signal structures in the foregoing implementations disclosed in this application help the terminal device adaptively select a quantity of time units for implementing synchronization, so that time required for synchronization can be further shortened when the channel condition is good.

In an implementation, there is the following relationship between each element in the second sequence and each element in the first sequence: $y_k = x_k x_k$, where $k = 1, 2, \ldots, m$. In this way, a sharper correlation peak can be obtained when a correlation operation is performed on a correlation operation result between the first sequence and the second sequence and a current sequence.

In the embodiments disclosed in this application, impact that is on a synchronization signal sent by the network device and that is caused by non-ideal factors such as a channel, noise, and a carrier frequency offset (simply referred to as a frequency offset) is not considered. It may be understood that even if the synchronization signal sent by the network device is affected by the non-ideal factors such as a channel, noise, and a carrier frequency offset (simply referred to as a frequency offset), after correlation processing is performed on the synchronization signal and a local sequence, a good autocorrelation property can still be retained, in other words, a clear correlation peak can occur, so that the terminal device accurately determines a timing location.

In the embodiments according to this application, the methods provided in the embodiments of this application are described from perspectives of the network device, the terminal, and interaction between the network device and the terminal. To implement functions in the foregoing method provided in the embodiments of this application, the network device and the terminal device may include a hardware structure and/or a software module, and implement the foregoing functions in a form of the hardware structure, the software module, or a combination of the hardware structure and the software module. Whether a function in the foregoing functions is performed by using the hardware structure, the software module, or the combination of the hardware structure and the software module depends on particular applications and design constraints of the technical solutions.

Figure 19:
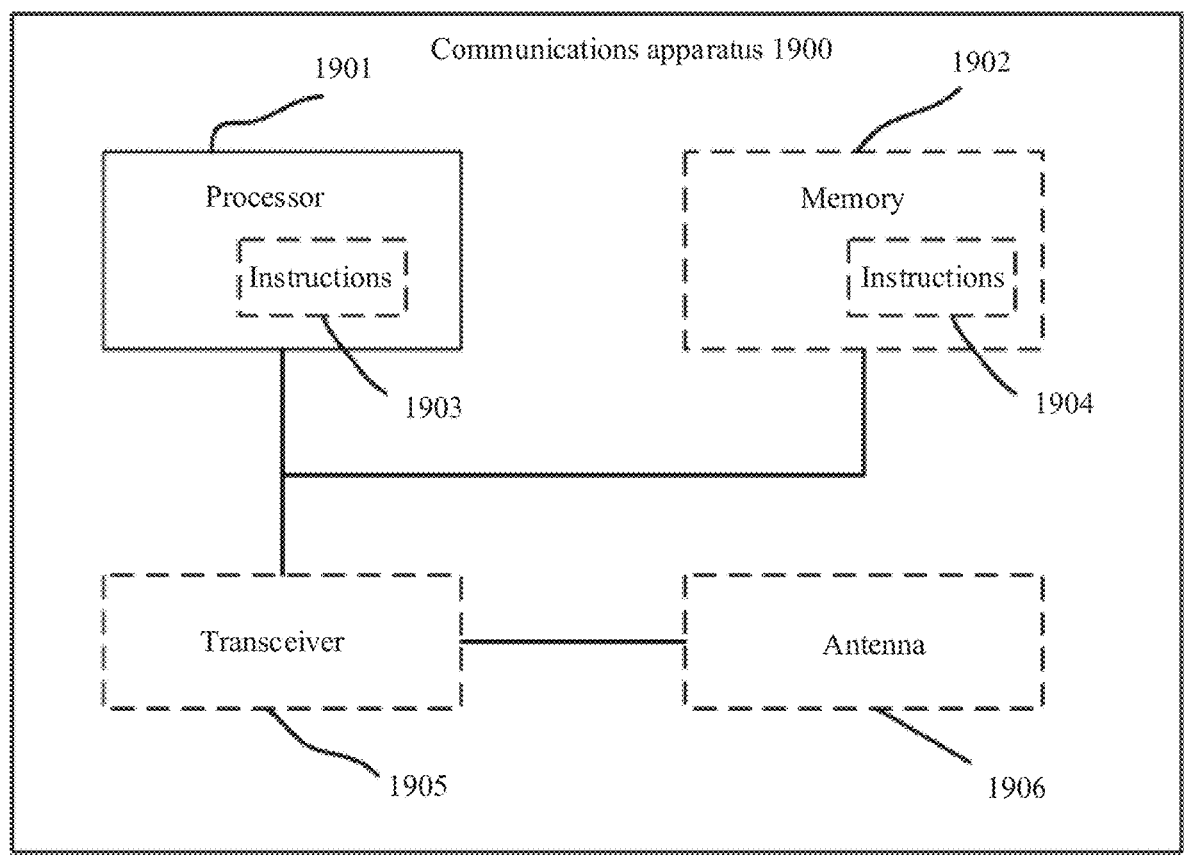
FIG. 19 is a schematic diagram of a structure of a communications apparatus according to an embodiment of this application.

FIG. 19 is a schematic diagram of a structure of a communications apparatus according to an embodiment of this application.

In a design, a network device or a chip, a chip system, or a processor that supports the network device in implementing the foregoing method may use the communications apparatus structure shown in FIG. 19, but is not limited to the communications apparatus structure shown in FIG. 19.

In another design, the communications apparatus structure shown in FIG. 19 may also be applied to a terminal device or a chip, a chip system, or a processor that supports the terminal device in implementing the foregoing method. However, the terminal device or the chip, the chip system, or the processor that supports the terminal device in implementing the foregoing method may not be limited to the communications apparatus structure shown in FIG. 19.

It should be noted herein that a communications apparatus on a side of the terminal and a communications apparatus on a side of the network device may have a same structure design or similar structure designs, in other words, both may be designed with reference to the structure shown in FIG. 19, and therefore FIG. 19 is not repeatedly presented or described. It can be learned by a person skilled in the art that the foregoing descriptions do not represent that a communications apparatus to which the structure of FIG. 19 is applied can implement functions of both the terminal device and the network device. When the structure is implemented on the side of the terminal device, the communications apparatus is configured to implement functions on the side of the terminal device. When the structure is implemented on the side of the network device, the communications apparatus is configured to implement functions on the side of the network device.

Based on the foregoing designs, the communications apparatus shown in FIG. 19 may be configured to implement the method described in the foregoing method embodiments. For details, refer to the descriptions in the foregoing method embodiments.

The communications apparatus may include one or more processors 1901. The processor 1901 may also be referred to as a processing unit, and may implement a specific control function. The processor 1901 may be a general-purpose processor, a dedicated processor, or the like. For example, the processor 1901 may be a baseband processor or a central processing unit. The baseband processor may be configured to process a communications protocol and communications data. The central processing unit may be configured to: control a communications apparatus (for example, a base station, a baseband chip, a terminal, a terminal chip, a DU, or a CU), execute a software program, and process data of the software program.

In an optional design, the processor 1901 may further store instructions and/or data 1903. The instructions and/or the data 1903 may run on the processor, so that the communications apparatus 1900 performs the method described in the foregoing method embodiments.

In another optional design, the processor 1901 may include a communications unit configured to implement receiving and sending functions. For example, the communications unit may be a transceiver circuit, an interface, or an interface circuit. A transceiver circuit, an interface, or an interface circuit configured to implement the sending function and a transceiver circuit, an interface, or an interface circuit configured to implement the receiving function may be separated, or may be integrated. The transceiver circuit, the interface, or the interface circuit may be configured to read and write code or data. Alternatively, the transceiver circuit, the interface, or the interface circuit may be configured to transmit or transfer a signal.

In still another possible design, the communications apparatus 1900 may include a circuit. The circuit may implement the sending, receiving, or communications function in the foregoing method embodiments.

Optionally, the communications apparatus 1900 may include one or more memories 1902, and the memory 1902 may store instructions 1904. The instructions may run on the processor, so that the communications apparatus 1900 performs the method described in the foregoing method embodiments. Optionally, the memory may further store data. Optionally, the processor may also store instructions and/or data. The processor and the memory may be disposed separately, or may be integrated. For example, the local sequence described in the foregoing method embodiments may be stored in the memory or the processor.

Optionally, the communications apparatus 1900 may further include a transceiver 1905 and an antenna 1906. The processor 1901 may be referred to as a processing unit, and controls the communications apparatus 1900. The transceiver 1905 may be referred to as a communications unit, a transceiver circuit, or the like, and is configured to implement receiving and sending functions.

In a possible design, a communications apparatus 1900 (for example, a network device, a base station, a baseband chip, a DU, or a CU) may include a processor, configured to generate a synchronization signal, where the synchronization signal includes a first sequence and a second sequence, and a transceiver, configured to send the synchronization signal.

A first time unit carrying the first sequence is different from a second time unit carrying the second sequence; and the first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

In an implementation, a correlation operation used to calculate the correlation processing result between the first sequence and the second sequence is an operation on corresponding elements of two sequences. The correlation processing result between the first sequence and the second sequence is a sequence obtained by performing point multiplication, point division, conjugate point multiplication, or conjugate point division on corresponding elements of the first sequence and the second sequence.

In an implementation, the first sequence is a sequence obtained based on the first complex sequence and a first calculation rule; the second sequence is a sequence obtained based on the first complex sequence and the first calculation rule; and the first calculation rule includes any one of a point multiplication rule, a conjugate point multiplication rule, and a conjugate point division rule. The first calculation rule is also an operation on corresponding elements of two sequences.

In an implementation, the first complex sequence is a ZC sequence; or the first complex sequence is a sequence obtained by performing inverse fast Fourier transformation (IFFT) or fast Fourier transformation (FFT) on the ZC sequence, an m sequence, or a gold sequence.

For related content of the first sequence and the second sequence, refer to the related content in the foregoing method embodiments. Details are not described herein again. For various optional implementations of the synchronization signal, refer to the related content described in FIG. 4 to FIG. 13 in the foregoing method embodiments. For processing processes in which the processor generates the synchronization signal and sends the synchronization signal, refer to the related content described in FIG. 16, FIG. 17, and FIG. 18. Details are not described herein again.

It can be learned that the synchronization signal sent by the communications apparatus can enable the correlation processing result obtained by the terminal device based on the synchronization signal to be a complex sequence and a sharp correlation peak to be obtained when a correlation operation is performed on the correlation processing result and a local sequence.

In another possible design manner, a communications apparatus 1900 (for example, a network device, a base station, a baseband chip, a DU, or a CU) may include:

a processor, configured to generate a synchronization signal, where the synchronization signal may include a constant sequence and a first sequence; and a transceiver, configured to send the synchronization signal, where a first time unit carrying the first sequence is different from a second time unit carrying the constant sequence.

The first sequence may be a first complex sequence or a sequence obtained based on the first complex sequence. A correlation processing result between the constant sequence and the first sequence is a complex sequence. Therefore, as shown in FIG. 11, a sharper correlation peak can also be obtained by using the synchronization signal transmission method in this aspect. In this way, duration required for synchronization is shortened, and quick synchronization is implemented.

In a possible design, a communications apparatus 1900 (for example, an integrated circuit, a wireless device, a circuit module, or a terminal device) may include a transceiver, configured to receive a synchronization signal from a network device, where the synchronization signal includes a first sequence and a second sequence, and a processor, configured to synchronize with the network device based on the synchronization signal.

A first time unit carrying a first sequence is different from a second time unit carrying a second sequence.

The first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

In an implementation, a correlation operation used to calculate the correlation processing result between the first sequence and the second sequence is an operation on corresponding elements of two sequences. The correlation processing result between the first sequence and the second sequence is a sequence obtained by performing point multiplication, point division, conjugate point multiplication, or conjugate point division on corresponding elements of the first sequence and the second sequence.

In an implementation, the first sequence is a sequence obtained based on the first complex sequence and a first calculation rule; the second sequence is a sequence obtained based on the first complex sequence and the first calculation rule; and the first calculation rule includes any one of a point multiplication rule, a conjugate point multiplication rule, and a conjugate point division rule. The first calculation rule is also an operation on corresponding elements of two sequences.

In an implementation, the first complex sequence is a ZC sequence; or the first complex sequence is a sequence obtained by performing inverse fast Fourier transformation (IFFT) or fast Fourier transformation (FFT) on the ZC sequence, an m sequence, or a gold sequence.

For related content of the first sequence and the second sequence, refer to the related content in the foregoing method embodiments. Details are not described herein again. For various optional implementations of the synchronization signal, refer to the related content described in FIG. 4 to FIG. 13 in the foregoing method embodiments. For processing processes in which the processor generates the synchronization signal and sends the synchronization signal, refer to the related content described in FIG. 16, FIG. 17, and FIG. 18. Details are not described herein again.

It can be learned that the terminal device can obtain a sharper correlation peak when synchronizing with the network device based on the synchronization signal. In this way, duration required for synchronization is shortened, and quick synchronization is implemented.

In another possible design, a communications apparatus 1900 (for example, an integrated circuit, a wireless device, a circuit module, or a terminal device) may include:

a transceiver, configured to receive a synchronization signal from a network device, where the synchronization signal may include a constant sequence and a first sequence; and a processor, configured to synchronize with the network device based on the synchronization signal, where a first time unit carrying the first sequence is different from a second time unit carrying the constant sequence.

The first sequence may be a first complex sequence or a sequence obtained based on the first complex sequence. A correlation processing result between the constant sequence and the first sequence is a complex sequence. Therefore, as shown in FIG. 11, a sharper correlation peak can also be obtained by using the synchronization signal transmission method in this aspect. In this way, duration required for synchronization is shortened, and quick synchronization is implemented.

The processor and the transceiver that are described in this application may be implemented on an integrated circuit (IC), an analog IC, a radio frequency integrated circuit (RFIC), a hybrid signal IC, an application-specific integrated circuit (ASIC), a printed circuit board (PCB), an electronic device, or the like.

Figure 20:
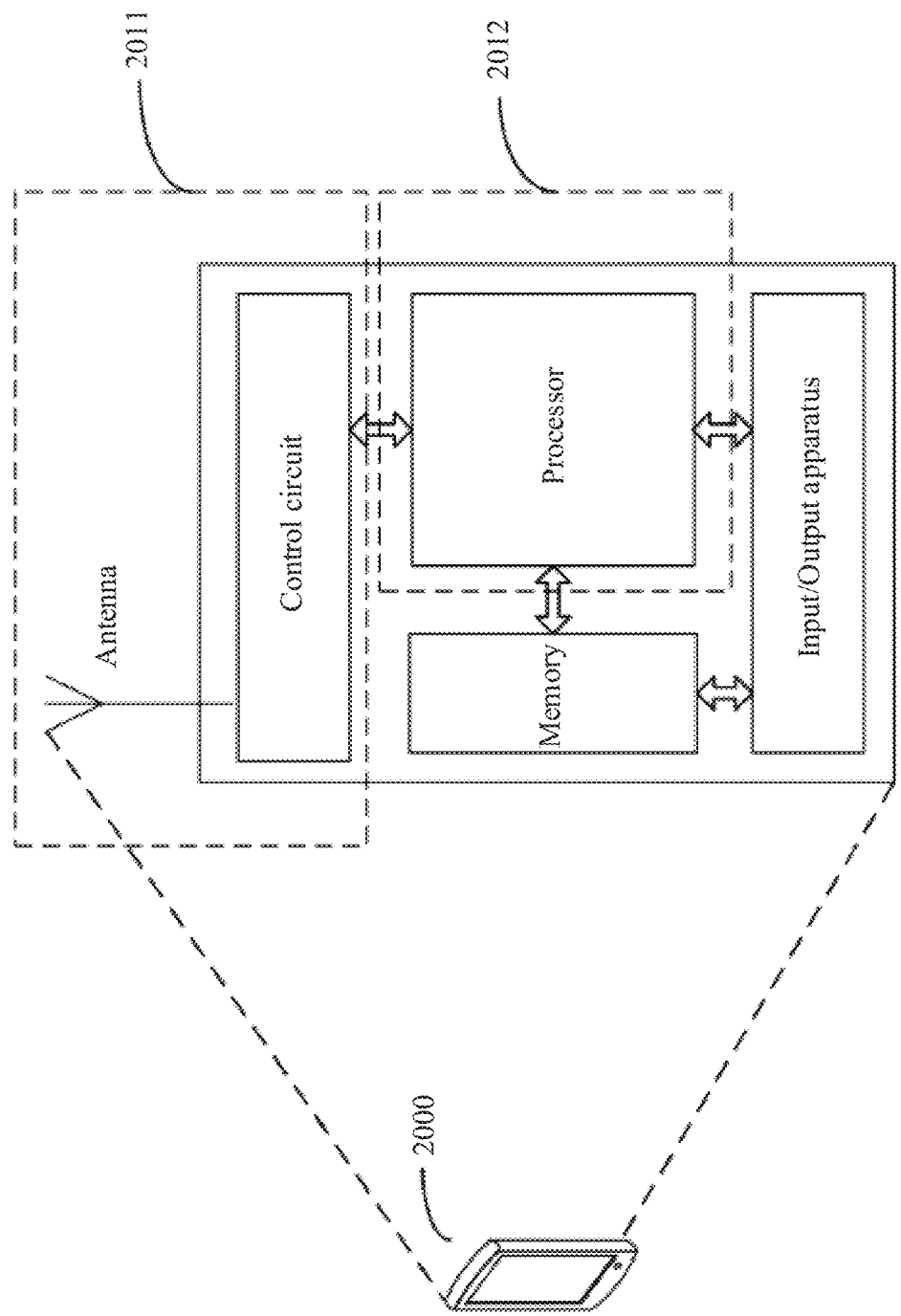
FIG. 20 is a schematic diagram of a structure of a terminal device according to an embodiment of this application.

FIG. 20 provides a schematic diagram of a structure of a terminal device. The terminal device is applicable to the scenario shown in FIG. 1. For ease of description, FIG. 20 shows only main components of the terminal device. As shown in FIG. 20, the terminal device includes a processor, a memory, a control circuit, an antenna, and an input/output apparatus. The processor is mainly configured to: process a communications protocol and communications data, control the entire terminal, execute a software program, and process data of the software program. The memory is mainly configured to store the software program and the data. A radio frequency circuit is mainly configured to: perform conversion between a baseband signal and a radio frequency signal, and process the radio frequency signal. The antenna is mainly configured to send and receive a radio frequency signal in an electromagnetic wave form. The input/output apparatus, for example, a touchscreen, a display screen, or a keyboard, is mainly configured to: receive data input by a user and output data to the user.

After the terminal device is powered on, the processor may read the software program in a storage unit, parse and execute instructions of the software program, and process the data of the software program. When data needs to be sent wirelessly, the processor performs baseband processing on the to-be-sent data, and outputs a baseband signal to the radio frequency circuit. The radio frequency circuit processes the baseband signal to obtain a radio frequency signal, and sends the radio frequency signal in an electromagnetic wave form by using the antenna. When data is sent to the terminal device, the radio frequency circuit receives a radio frequency signal by using the antenna, further converts the radio frequency signal into a baseband signal, and outputs the baseband signal to the processor. The processor converts the baseband signal into data, and processes the data.

For ease of description, FIG. 20 shows only one memory and one processor. In an actual terminal device, there may be a plurality of processors and a plurality of memories. The memory may also be referred to as a readable storage medium, a storage device, or the like. This is not limited in this embodiment of this application.

In an optional implementation, the processor may include a baseband processor and a central processing unit. The baseband processor is mainly configured to process the communications protocol and the communications data. The central processing unit is mainly configured to: control the entire terminal device, execute the software program, and process the data of the software program.

In an example, the antenna and the control circuit that have receiving and sending functions may be considered as a communications unit 2011 of the terminal device, and the processor with a processing function may be considered as a processing unit 2012 of the terminal device. As shown in FIG. 20, the terminal device includes the communications unit 2011 and the processing unit 2012. The communications unit may also be referred to as a transceiver, a transceiver apparatus, or the like. Optionally, a component that is in the communications unit 2011 and that is configured to implement the receiving function may be considered as a receiving unit, and a component that is in the communications unit 2011 and that is configured to implement the sending function may be considered as a sending unit. In other words, the communications unit 2011 includes the receiving unit and the sending unit. For example, the receiving unit may also be referred to as a receiver, a receiving circuit, or the like; and the sending unit may be referred to as a transmitter, a transmitting circuit, or the like. Optionally, the receiving unit and the sending unit may be one integrated unit, or may be a plurality of independent units. The receiving unit and the sending unit may be in one geographical location, or may be distributed in a plurality of geographical locations.

Figure 21:
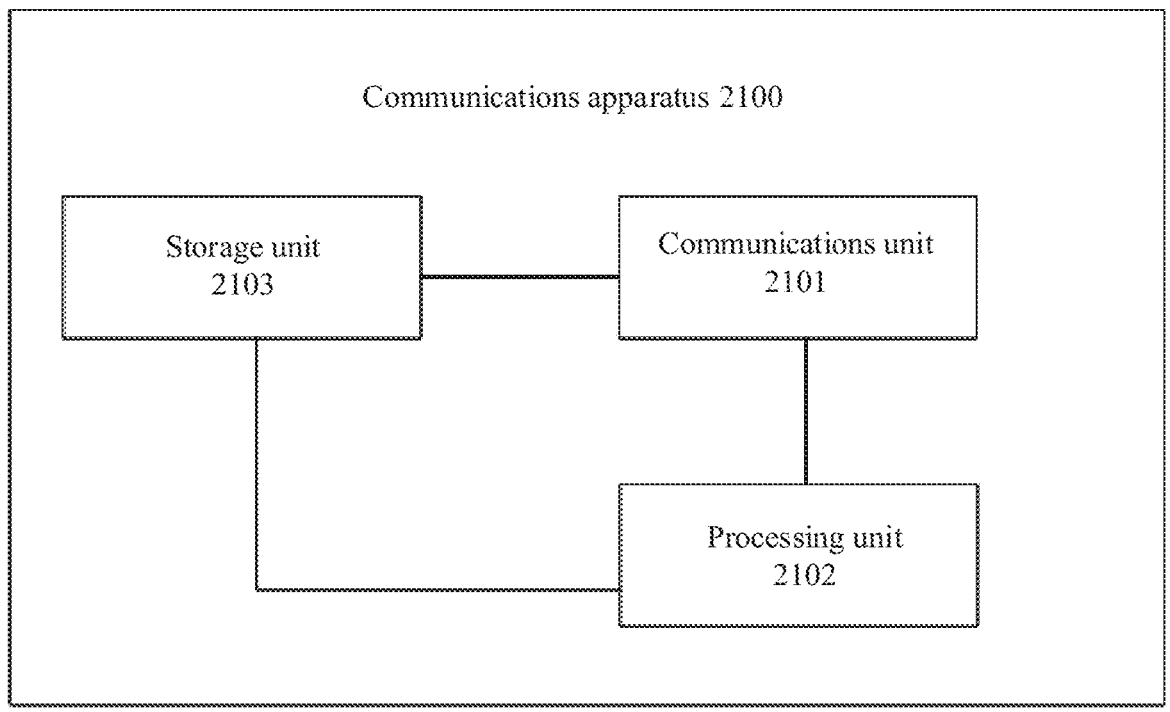
FIG. 21 is a schematic diagram of a structure of another communications apparatus according to an embodiment of this application.

As shown in FIG. 21, an embodiment of this application provides another communications apparatus 2100. The communications apparatus may be a terminal, or may be a component (for example, an integrated circuit or a chip) of the terminal. Alternatively, the communications apparatus may be a network device or a component (for example, an integrated circuit or a chip) of the network device. Alternatively, the communications apparatus may be another communications unit, configured to implement the method in the method embodiments of this application. The communications apparatus 2100 may include a processing unit 2102. Optionally, the communications apparatus 2100 may further include a communications unit 2101 and a storage unit 2103.

In a possible design, one or more modules in FIG. 21 may be implemented by one or more processors, may be implemented by one or more processors and memories, may be implemented by one or more processors and transceivers, or may be implemented by one or more processors, memories, and transceivers. This is not limited in this embodiment of this application. The processor, the memory, and the transceiver may be disposed separately, or may be integrated.

The communications apparatus implements functions of the terminal device or the network device described in the embodiments of this application. For example, the communications apparatus includes a module or a unit or a means corresponding to performing the steps of the terminal device in the embodiments of this application by the terminal device. The function or the unit or the means may be implemented by software, or may be implemented by hardware, or may be implemented by hardware executing corresponding software, or may be implemented in a combination of software and hardware. For details, refer to the corresponding descriptions in the foregoing corresponding method embodiments.

In a possible design, a communications apparatus 2100 may include:
  a communications unit 2101, configured to receive a synchronization signal from a network device; and
  a processing unit 2102, configured to synchronize with the network device based on the synchronization signal.

A first time unit carrying a first sequence is different from a second time unit carrying a second sequence.

The first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

For related content of the first sequence and the second sequence, refer to the related content in the foregoing method embodiments. Details are not described herein again. For various optional implementations of the synchronization signal, refer to the related content described in FIG. 4 to FIG. 13 in the foregoing method embodiments. For processing processes in which the processor generates the synchronization signal and sends the synchronization signal, refer to the related content described in FIG. 16, FIG. 17, and FIG. 18. Details are not described herein again.

It can be learned that the synchronization signal helps obtain a sharper correlation peak when synchronization with the network device is implemented. In this way, duration required for synchronization is shortened, and quick synchronization is implemented.

In another possible design, a communications apparatus 2100 may include:

- a processing unit 2102, configured to generate a synchronization signal, where the synchronization signal includes a first sequence and a second sequence; and
- a communications unit 2101, configured to send the synchronization signal.

A first time unit carrying the first sequence is different from a second time unit carrying the second sequence.

The first sequence is a first complex sequence or a sequence obtained based on the first complex sequence, and the second sequence is a sequence obtained based on the first complex sequence.

The first sequence is different from the second sequence, and a correlation processing result between the first sequence and the second sequence is a complex sequence.

For related content of the first sequence and the second sequence, refer to the related content in the foregoing method embodiments. Details are not described herein again. For various optional implementations of the synchronization signal, refer to the related content described in FIG. 4 to FIG. 13 in the foregoing method embodiments. For processing processes in which the processor generates the synchronization signal and sends the synchronization signal, refer to the related content described in FIG. 16, FIG. 17, and FIG. 18. Details are not described herein again.

It can be learned that a terminal device obtains a sharper correlation peak when synchronizing with a network device based on the synchronization signal. In this way, duration required for synchronization is shortened, and quick synchronization is implemented.

In still another possible design manner, a communications apparatus 2100 may include:

- a processing unit 2102, configured to generate a synchronization signal, where the synchronization signal may include a constant sequence and a first sequence; and
- a communications unit 2101, configured to send the synchronization signal, where a first time unit carrying the first sequence is different from a second time unit carrying the constant sequence.

The first sequence may be a first complex sequence or a sequence obtained based on the first complex sequence. A correlation processing result between the constant sequence and the first sequence is a complex sequence. Therefore, as shown in FIG. 11, a sharper correlation peak can also be obtained by using the synchronization signal transmission method in this aspect. In this way, duration required for synchronization is shortened, and quick synchronization is implemented.

In still another possible design, a communications apparatus 2100 may include:

- a communications unit 2101, configured to receive a synchronization signal from a network device, where the synchronization signal may include a constant sequence and a first sequence; and
- a processing unit 2102, configured to synchronize with the network device based on the synchronization signal, where a first time unit carrying the first sequence is different from a second time unit carrying the constant sequence.

The first sequence may be a first complex sequence or a sequence obtained based on the first complex sequence. A correlation processing result between the constant sequence and the first sequence is a complex sequence. Therefore, as shown in FIG. 11, a sharper correlation peak can also be obtained by using the synchronization signal transmission method in this aspect. In this way, duration required for synchronization is shortened, and quick synchronization is implemented.

It may be understood that, in some scenarios, some optional features in the embodiments of this application may be independently implemented without depending on another feature, for example, a solution on which the optional features are currently based, to resolve a corresponding technical problem and achieve a corresponding effect. Alternatively, in some scenarios, the optional features are combined with other features based on requirements. Correspondingly, the communications apparatus provided in the embodiments of this application may also implement these features or functions. Details are not described herein again.

A person skilled in the art may further understand that various illustrative logical blocks and steps that are listed in the embodiments of this application may be implemented by using electronic hardware, computer software, or a combination thereof. Whether the functions are implemented by using hardware or software depends on particular applications and a design requirement of the entire system.

It should be understood that the processor in the embodiments of this application may be an integrated circuit chip, and has a signal processing capability. In an implementation process, the steps in the foregoing method embodiments may be completed by using a hardware integrated logic circuit in a processor or instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component.

It may be understood that the memory in the embodiments of this application may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), and is used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct Rambus random access memory (direct Rambus RAM, DR RAM). It should be noted that, the memory in the system and the method described in this specification includes but is not limited to these memories and any memory of another proper type.

This application further provides a computer-readable medium. The computer-readable medium stores a computer program. When the computer program is executed by a computer, functions of any one of the foregoing method embodiments are implemented.

This application further provides a computer program product. When the computer program product is executed by a computer, functions of any one of the foregoing method embodiments are implemented.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer instructions are loaded and executed on a computer, all or some of the procedures or functions according to the embodiments of this application are generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a high-dense digital video disc (DVD)), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, applied to a terminal device, wherein the method comprises:
   generating a synchronization signal, wherein the synchronization signal comprises a first sequence and a second sequence; and
   sending the synchronization signal, wherein:
      a first time unit carrying the first sequence is different from a second time unit carrying the second sequence;
      the first sequence is a sequence obtained based on a first complex sequence and a first calculation rule, the first calculation rule comprises any one of a point multiplication rule, a conjugate point multiplication rule, and a conjugate point division rule, and the second sequence is a sequence obtained based on the first complex sequence and the first calculation rule; and
      the first sequence is different from the second sequence, and a correlation processing result between the first sequence and the second sequence is a complex sequence.

2. The method according to claim 1, wherein resources occupied by the synchronization signal in time domain comprise a first time unit group and a second time unit group, the first time unit is any time unit in the first time unit group, and the second time unit is any time unit in the second time unit group.

3. The method according to claim 2, wherein the resources occupied by the synchronization signal in time domain comprise N time units, and N is an integer greater than or equal to 2, the first time unit group consists of time units whose numbers are odd numbers in the N time units, and the second time unit group consists of time units whose numbers are even numbers in the N time units.

4. The method according to claim 2, wherein the resources occupied by the synchronization signal in time domain comprise N time units;
   the first time unit group consists of the first L time units in time domain in the N time units;
   the second time unit group consists of the last (N−L) time units in time domain in the N time units; and
   N is an integer greater than or equal to 2, and L is $\lfloor N/2 \rfloor$ or $\lceil N/2 \rceil$.

5. The method according to claim 1, wherein:
   resources occupied by the synchronization signal in time domain comprise N time units, and the first time unit is located before the second time unit in time domain;
   when a number M1 of the first time unit in the N time units is equal to 1, the first sequence is the first complex sequence;
   when the number M1 of the first time unit in the N time units is greater than 1, the first sequence is a sequence obtained based on the first calculation rule and M1 first complex sequences; and
   the second sequence is a sequence obtained based on the first calculation rule and M2 first complex sequences, M2 is a number of the second time unit in the N time units, and M2 is an integer greater than 1.

6. The method according to claim 1, wherein the second sequence is obtained by applying the first calculation rule to the first sequence and the first complex sequence, and the second time unit is a time unit adjacent to the first time unit.

7. The method according to claim 1, wherein:
   the first complex sequence is a ZC sequence; or
   the first complex sequence is a sequence obtained by performing inverse fast Fourier transformation (IFFT) or fast Fourier transformation (FFT) on the ZC sequence, an m sequence, or a gold sequence.

8. A synchronization signal transmission method, comprising:
   receiving a synchronization signal from a network device, wherein the synchronization signal comprises a first sequence and a second sequence; and
   synchronizing with the network device based on the synchronization signal, wherein:
      a first time unit carrying the first sequence is different from a second time unit carrying the second sequence;
      the first sequence is a sequence obtained based on a first complex sequence and a first calculation rule, the first calculation rule comprises any one of a point multiplication rule, a conjugate point multiplication rule, and a conjugate point division rule, and the second sequence is a sequence obtained based on the first complex sequence and the first calculation rule; and
      the first sequence is different from the second sequence, and a correlation processing result between the first sequence and the second sequence is a complex sequence.

9. The method according to claim 8, wherein resources occupied by the synchronization signal in time domain comprise a first time unit group and a second time unit group, the first time unit is any time unit in the first time unit group, and the second time unit is any time unit in the second time unit group.

10. The method according to claim 9, wherein the resources occupied by the synchronization signal in time domain comprise N time units, and N is an integer greater than or equal to 2;
the first time unit group consists of time units whose numbers are odd numbers in the N time units; and
the second time unit group consists of time units whose numbers are even numbers in the N time units.

11. The method according to claim 9, wherein the resources occupied by the synchronization signal in time domain comprise N time units;
the first time unit group consists of the first L time units in time domain in the N time units;
the second time unit group consists of the last (N−L) time units in time domain in the N time units; and
N is an integer greater than or equal to 2, and L is $\lfloor N/2 \rfloor$ or $\lceil N/2 \rceil$.

12. The method according to claim 8, wherein resources occupied by the synchronization signal in time domain comprise N time units, and the first time unit is located before the second time unit in time domain;
when a number M1 of the first time unit in the N time units is equal to 1, the first sequence is the first complex sequence; or when the number M1 of the first time unit in the N time units is greater than 1, the first sequence is a sequence obtained based on the first calculation rule and M1 first complex sequences; and
the second sequence is a sequence obtained based on the first calculation rule and M2 first complex sequences, M2 is a number of the second time unit in the N time units, and M2 is an integer greater than 1.

13. The method according to claim 8, wherein the second sequence is obtained by applying the first calculation rule to the first sequence and the first complex sequence, and the second time unit is a time unit adjacent to the first time unit.

14. The method according to claim 8, wherein:
the first complex sequence is a ZC sequence; or
the first complex sequence is a sequence obtained by performing inverse fast Fourier transformation (IFFT) or fast Fourier transformation (FFT) on the ZC sequence, an m sequence, or a gold sequence.

15. A communications apparatus, comprising:
at least one processor configured to generate a synchronization signal, wherein the synchronization signal comprises a first sequence and a second sequence; and
a communications unit, configured to send the synchronization signal, wherein:
a first time unit carrying the first sequence is different from a second time unit carrying the second sequence;
the first sequence is a sequence obtained based on a first complex sequence and a first calculation rule, the first calculation rule comprises any one of a point multiplication rule, a conjugate point multiplication rule, and a conjugate point division rule, and the second sequence is a sequence obtained based on the first complex sequence and the first calculation rule; and
the first sequence is different from the second sequence, and a correlation processing result between the first sequence and the second sequence is a complex sequence.

16. The apparatus according to claim 15, wherein resources occupied by the synchronization signal in time domain comprise a first time unit group and a second time unit group;
the first time unit is any time unit in the first time unit group; and
the second time unit is any time unit in the second time unit group.

17. The apparatus according to claim 16, wherein the resources occupied by the synchronization signal in time domain comprise N time units, and N is an integer greater than or equal to 2;
the first time unit group consists of time units whose numbers are odd numbers in the N time units; and
the second time unit group consists of time units whose numbers are even numbers in the N time units.

* * * * *

UNITED STATES PATENT AND TRADEMARK OFFICE
CERTIFICATE OF CORRECTION

PATENT NO. : 12,256,348 B2
APPLICATION NO. : 17/585159
DATED : March 18, 2025
INVENTOR(S) : Juan Zheng, Chaojun Li and Tong Ji Page 1 of 1

It is certified that error appears in the above-identified patent and that said Letters Patent is hereby corrected as shown below:

In the Claims

In Column 38, In Line 25, In Claim 5, delete "Ml" and insert -- M1 --.

In Column 39, In Line 29 (Approx.), In Claim 12, delete "Ml" and insert -- M1 --.

Signed and Sealed this
Twenty-second Day of July, 2025

Coke Morgan Stewart
*Acting Director of the United States Patent and Trademark Office*